Feb. 27, 1962     F. R. BALISH ET AL     3,023,371
PRECISION VARIABLE FREQUENCY GENERATOR
Filed March 7, 1958     17 Sheets-Sheet 3
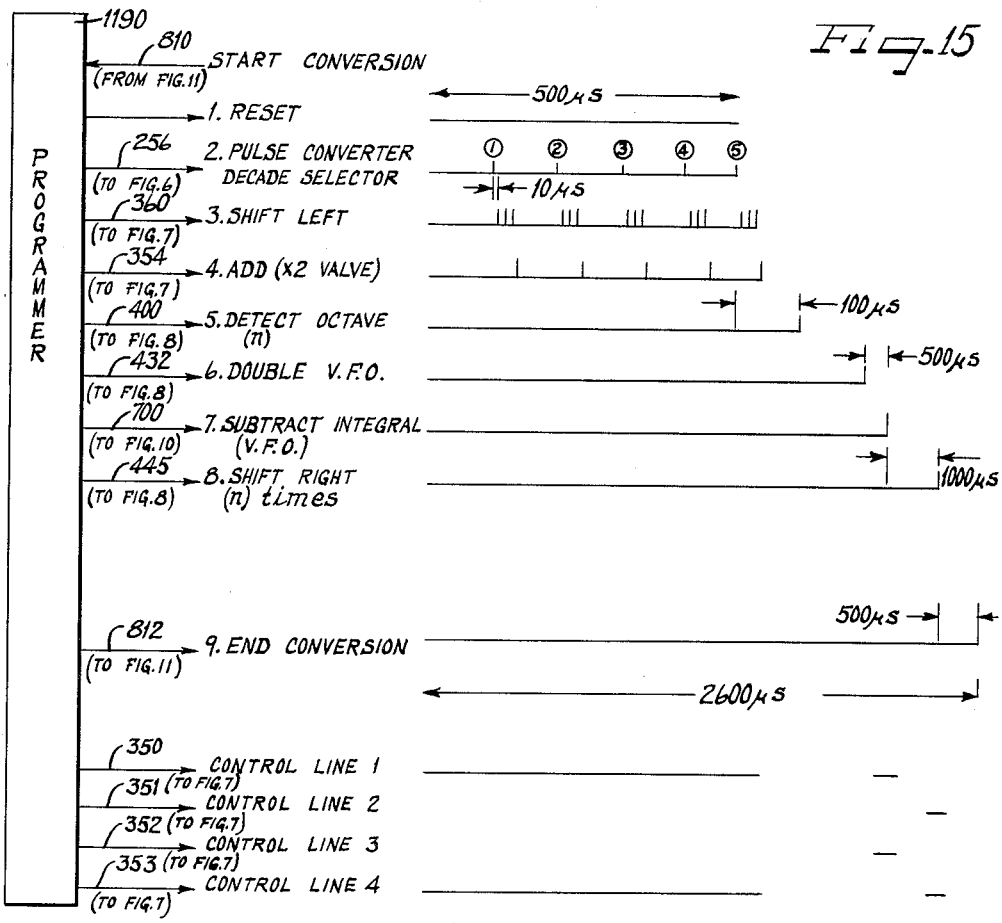
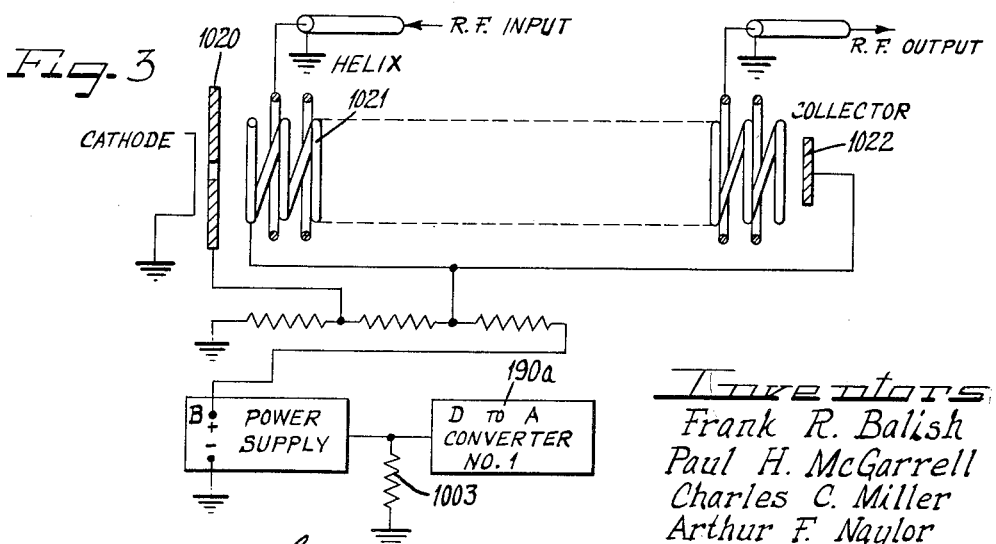
Inventors
Frank R. Balish
Paul H. McGarrell
Charles C. Miller
Arthur F. Naylor

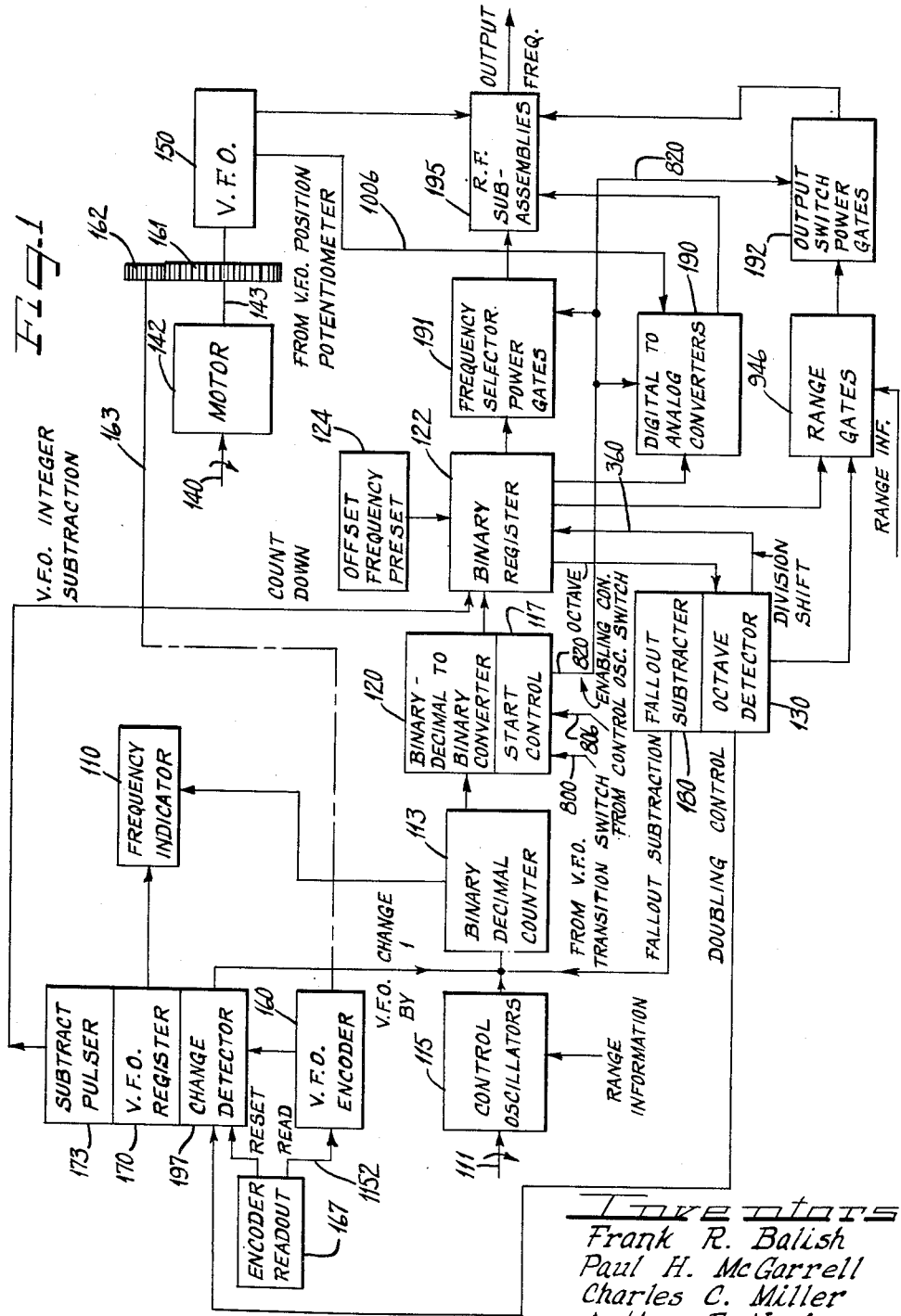

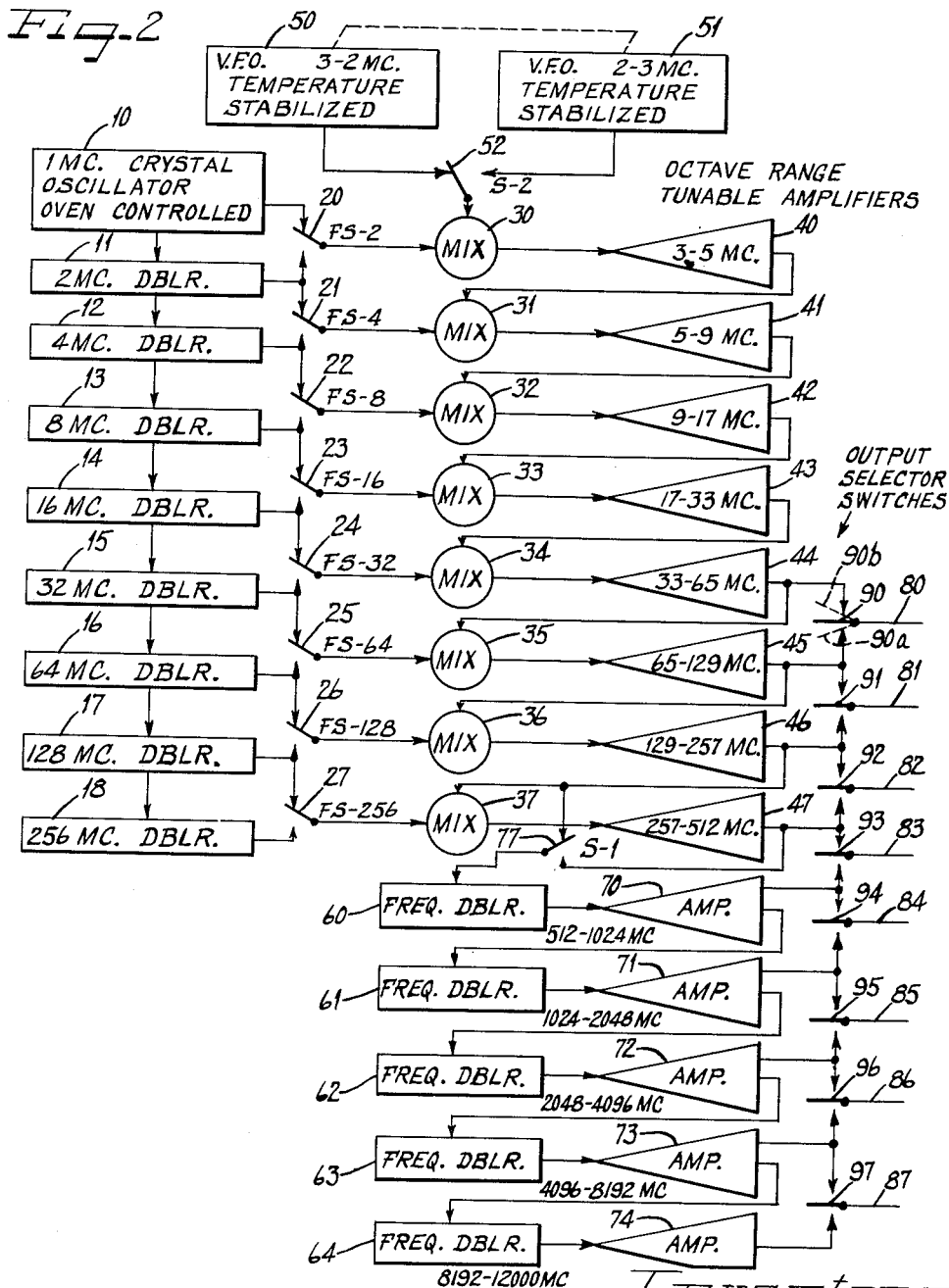

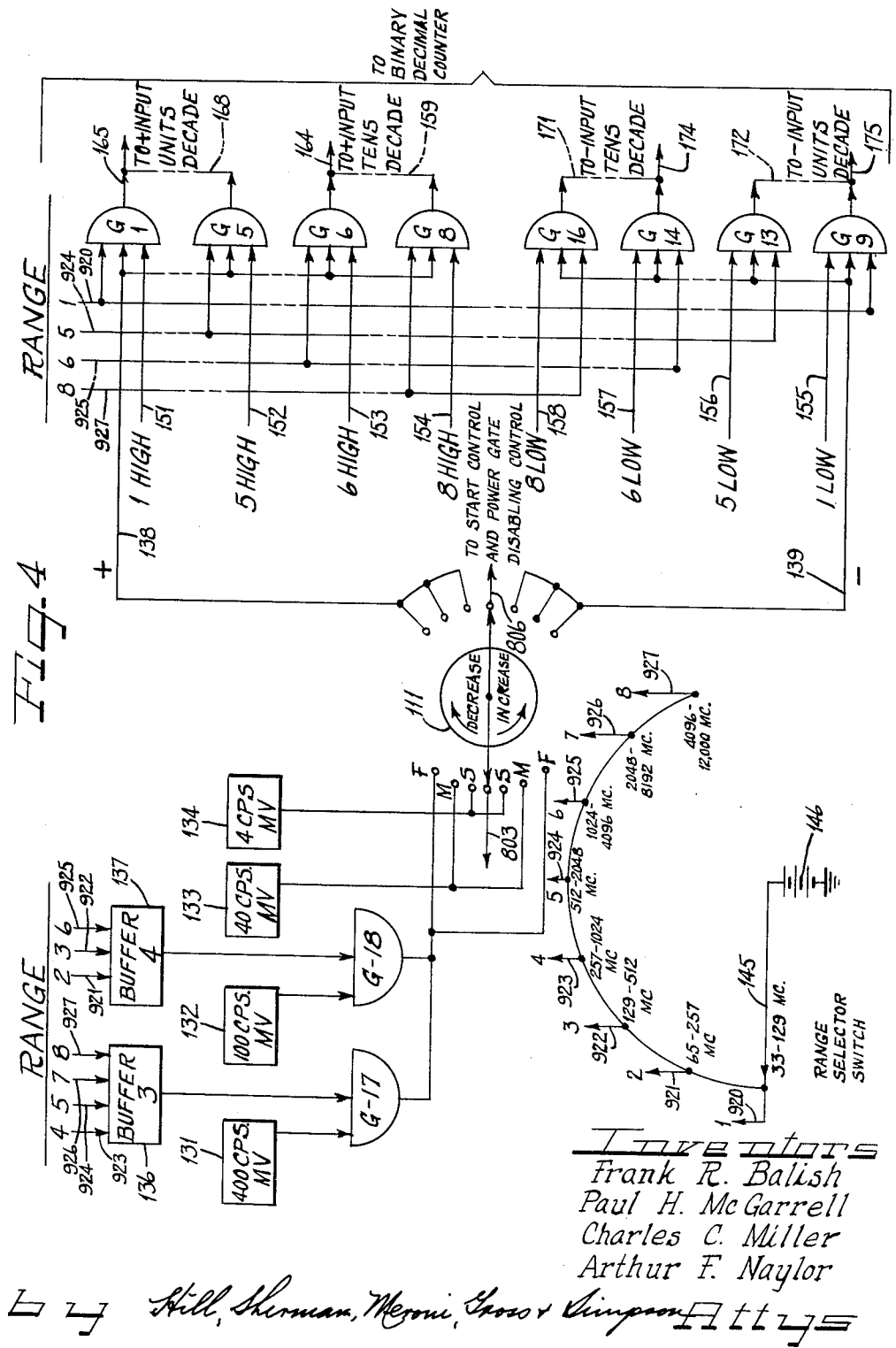

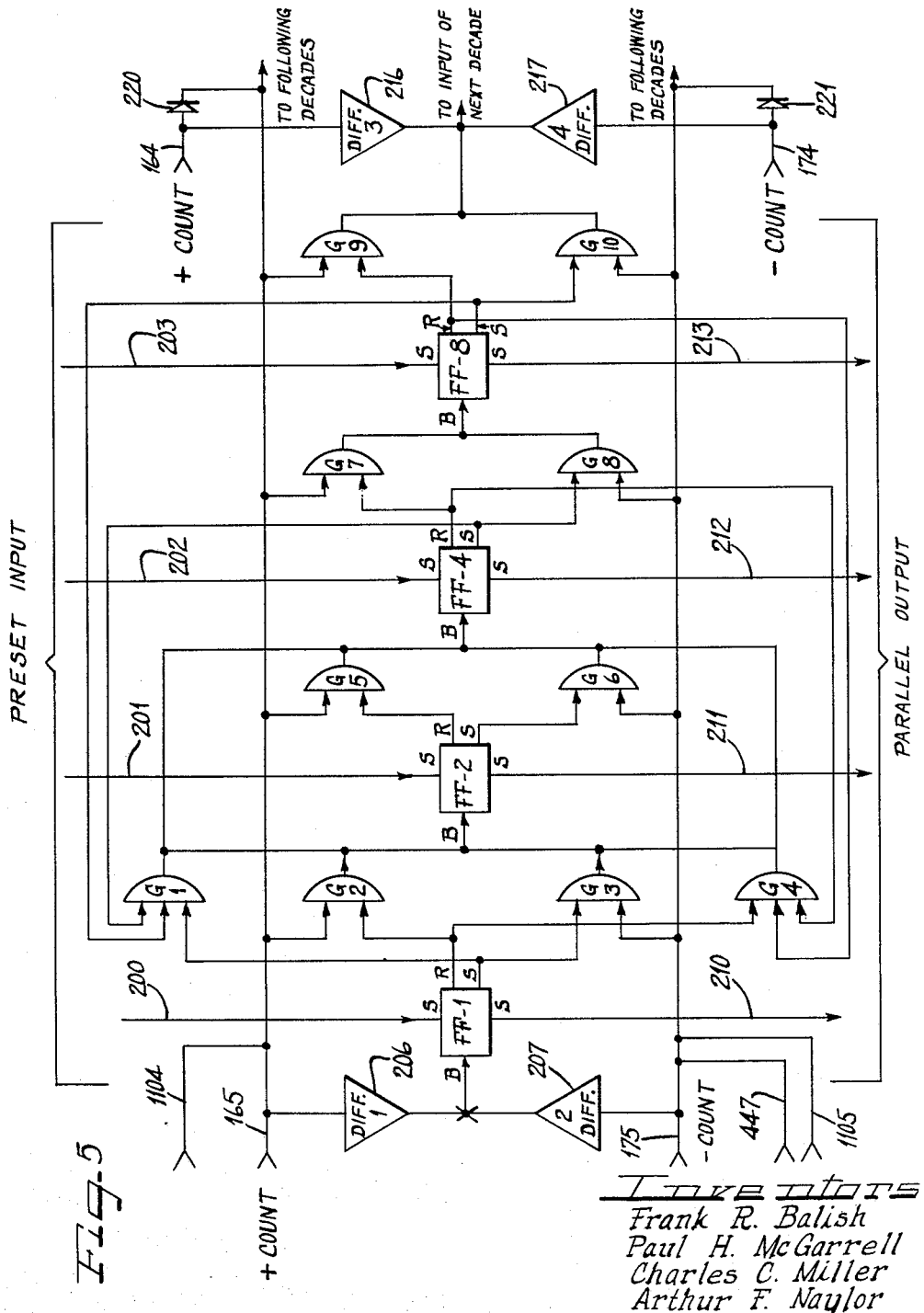

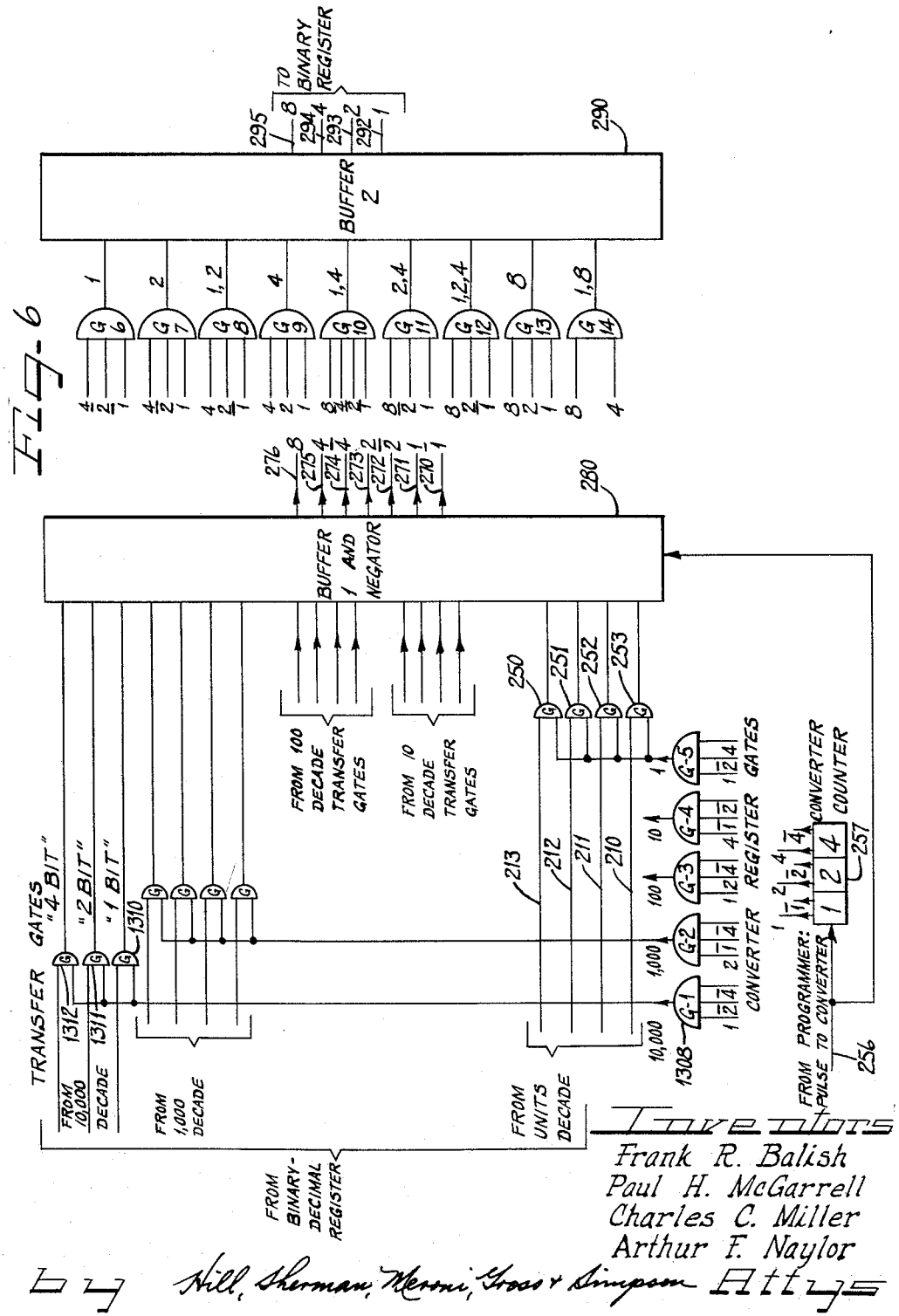

Inventors
Frank R. Balish
Paul H. McGarrell
Charles C. Miller
Arthur F. Naylor

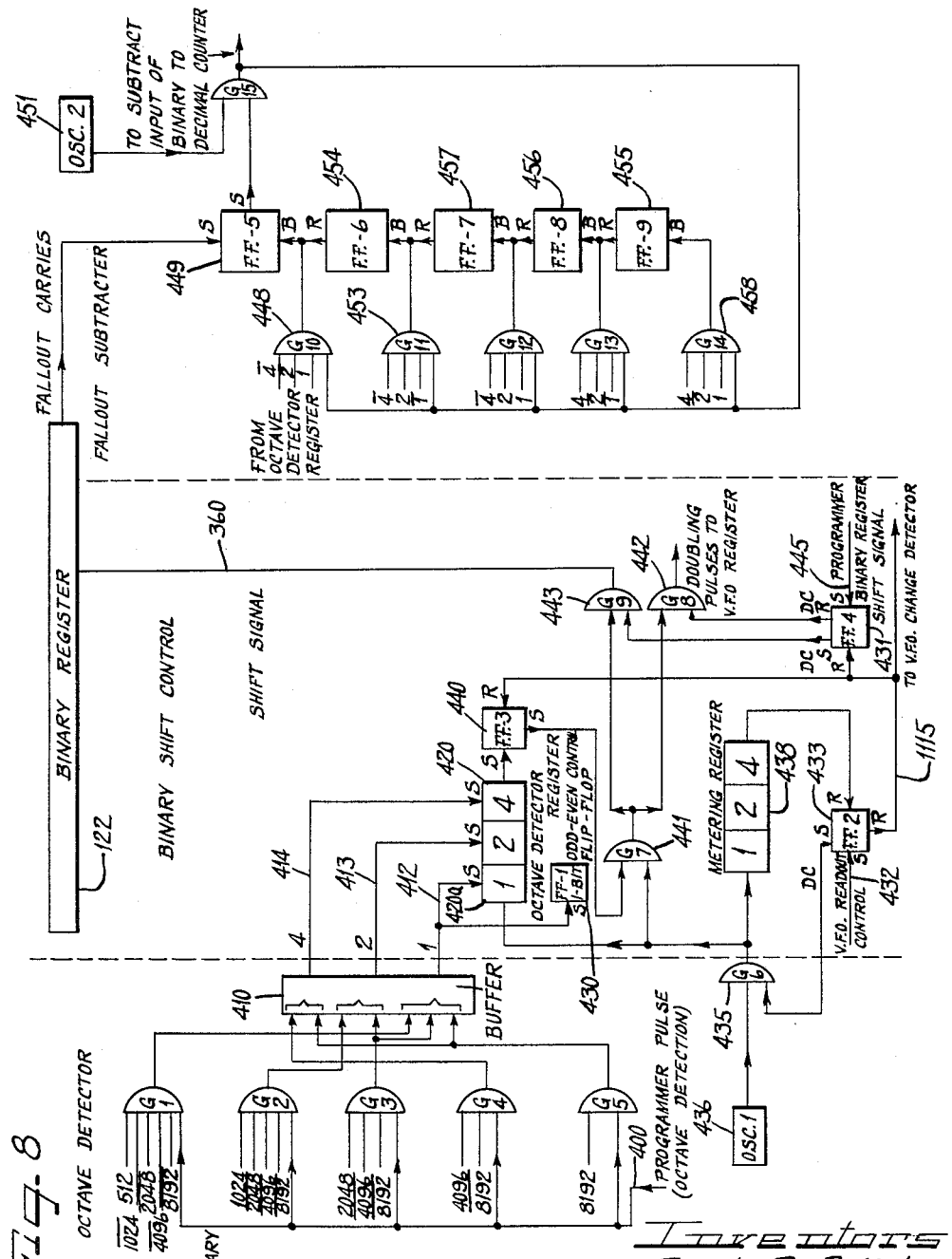

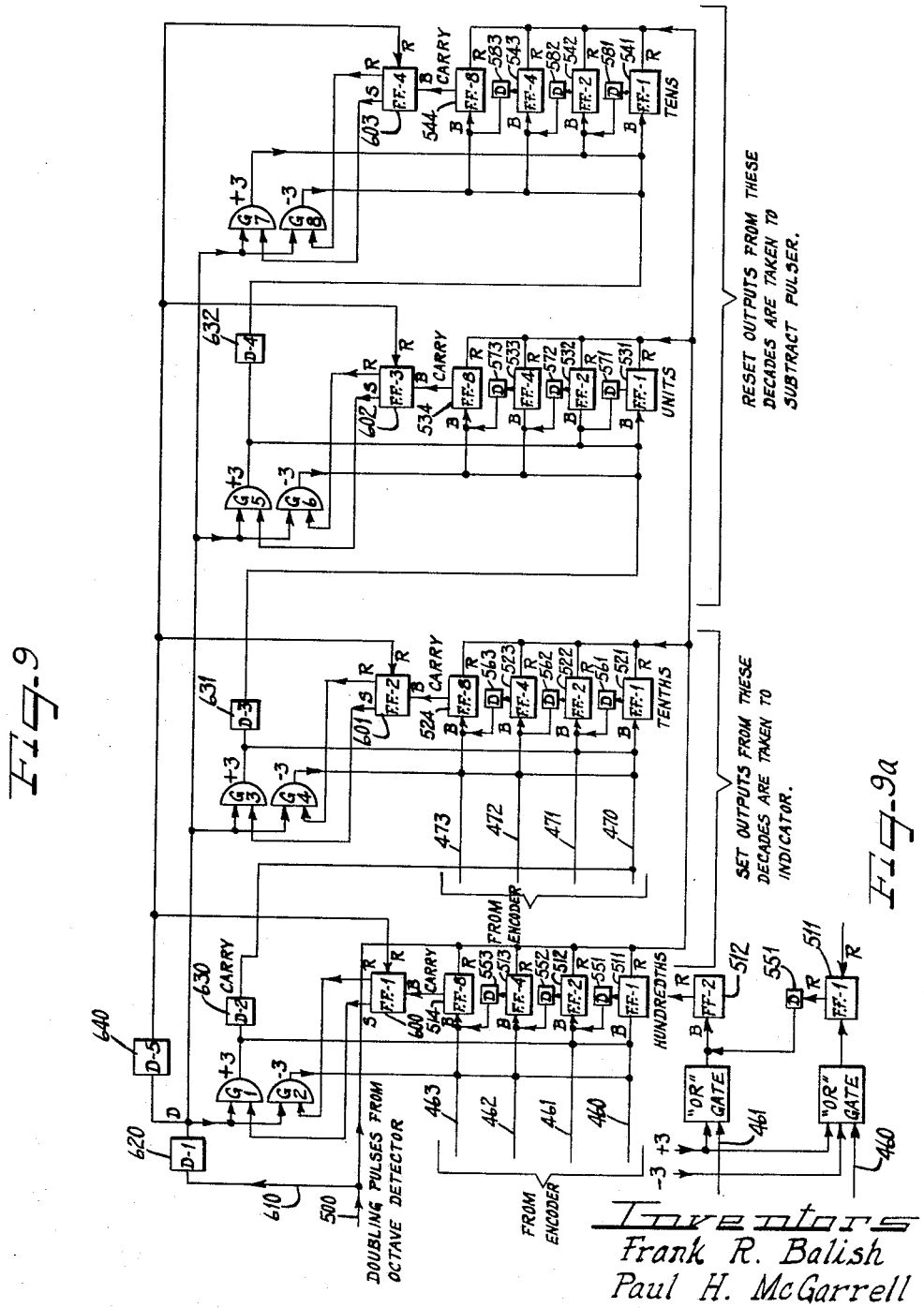

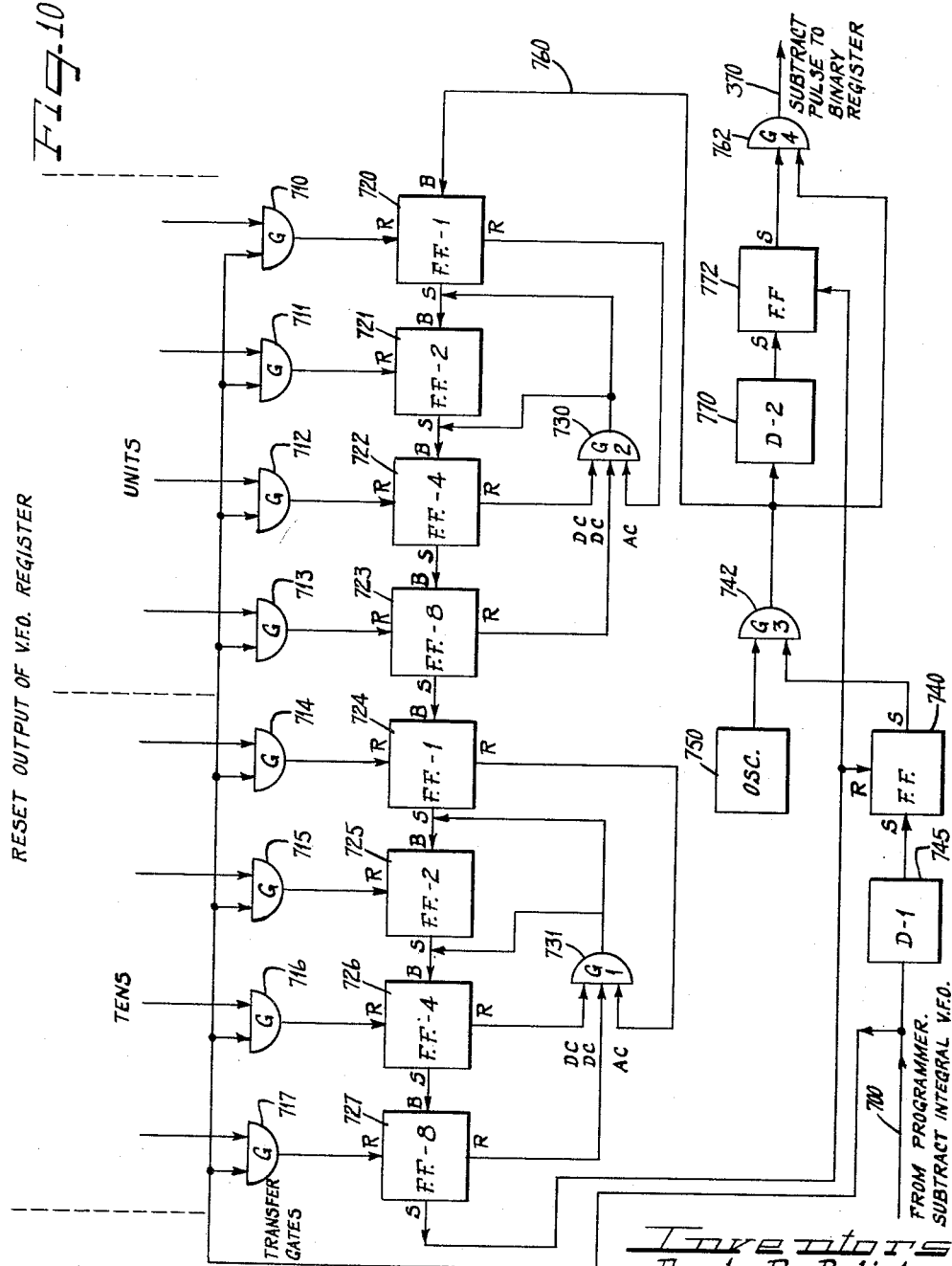

Feb. 27, 1962 F. R. BALISH ET AL 3,023,371
PRECISION VARIABLE FREQUENCY GENERATOR
Filed March 7, 1958 17 Sheets-Sheet 11
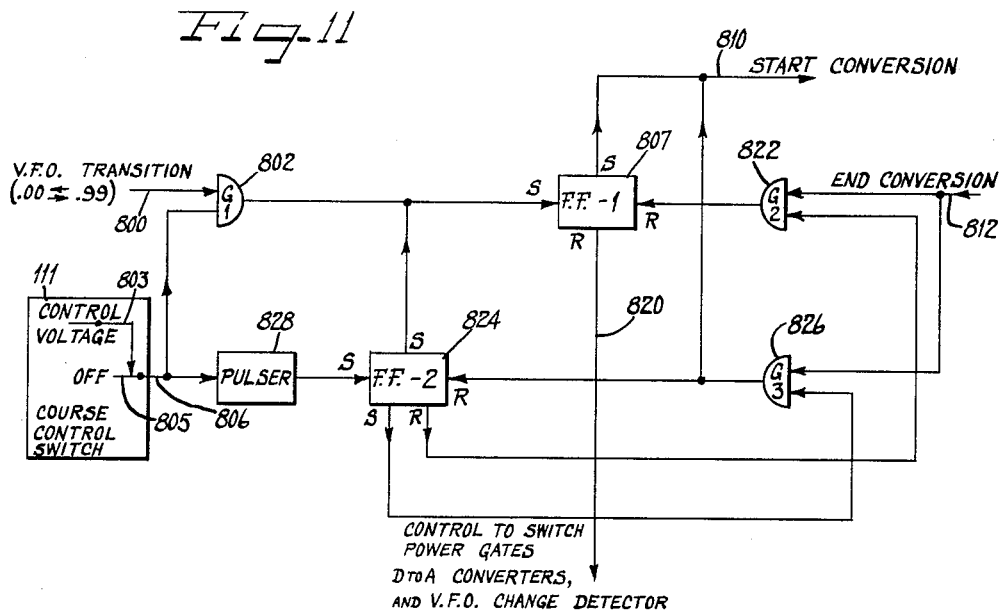
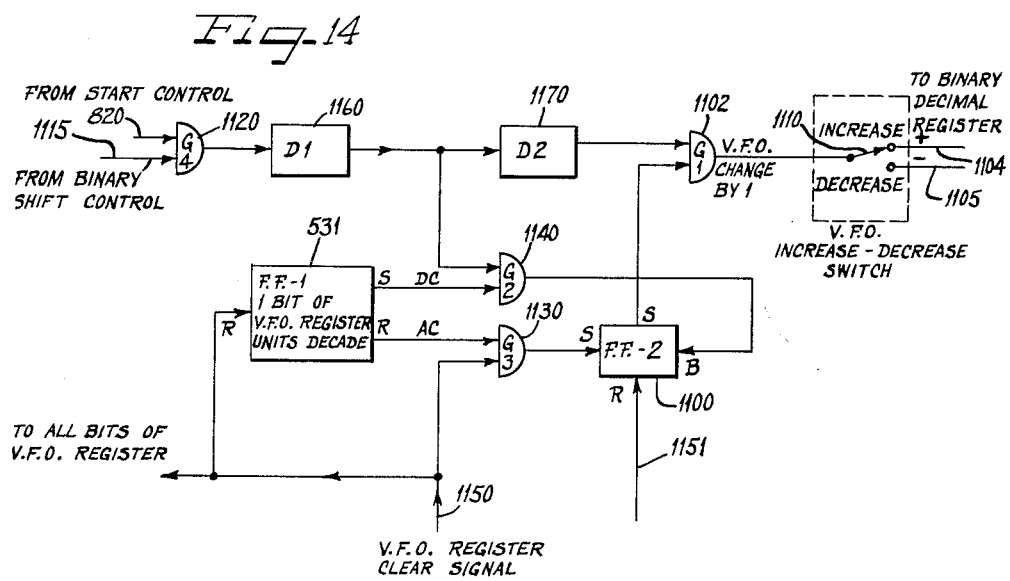
Inventors
Frank R. Balish
Paul H. McGarrell
Charles C. Miller
Arthur F. Naylor
by Hill, Sherman, Meroni, Gross & Simpson Attys Feb. 27, 1962    F. R. BALISH ET AL    3,023,371
PRECISION VARIABLE FREQUENCY GENERATOR
Filed March 7, 1958    17 Sheets-Sheet 12
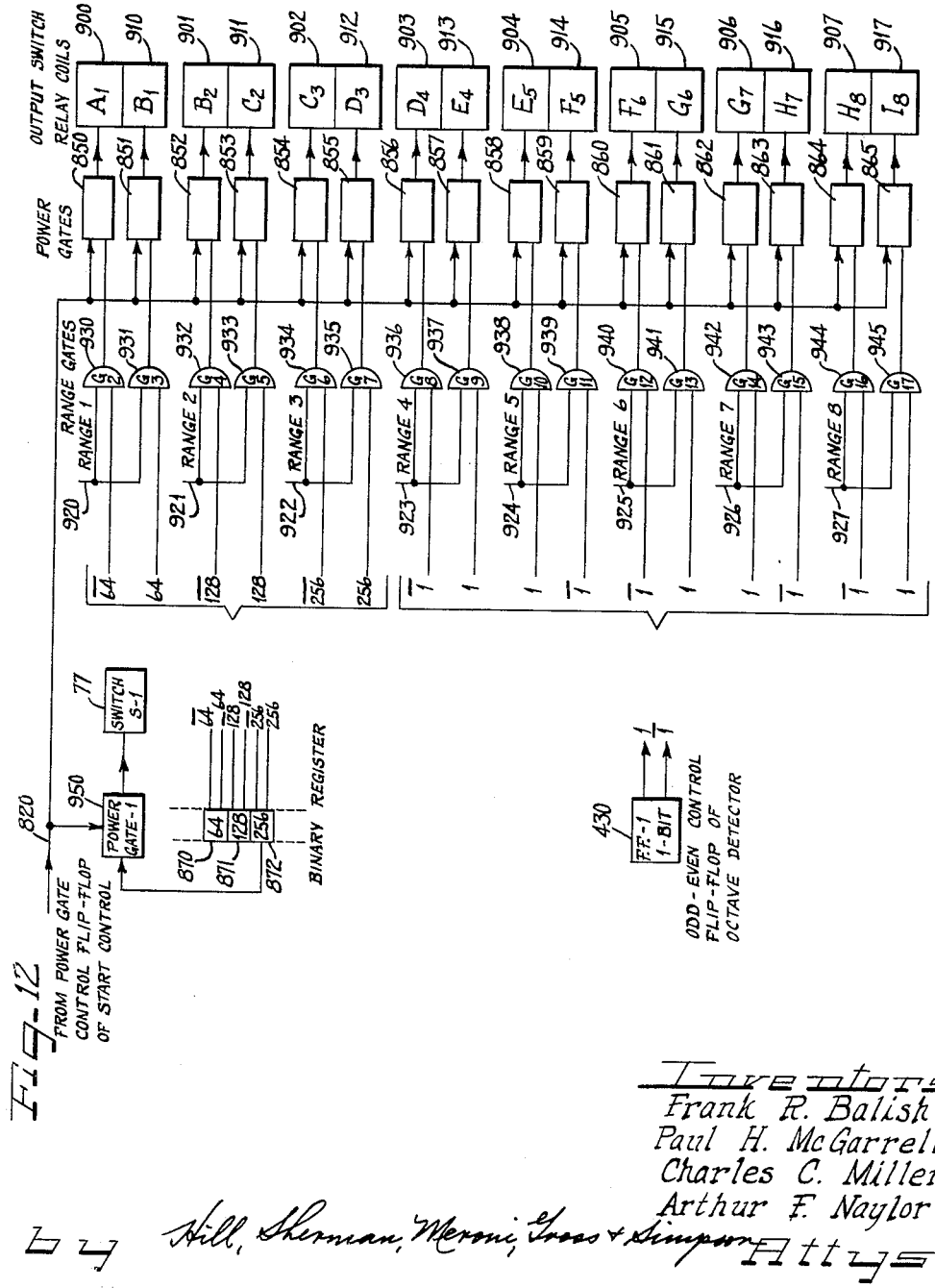
Inventors
Frank R. Balish
Paul H. McGarrell
Charles C. Miller
Arthur F. Naylor
By Hill, Sherman, Meroni, Gross & Simpson
Attys Feb. 27, 1962 F. R. BALISH ET AL 3,023,371
PRECISION VARIABLE FREQUENCY GENERATOR
Filed March 7, 1958 17 Sheets-Sheet 13
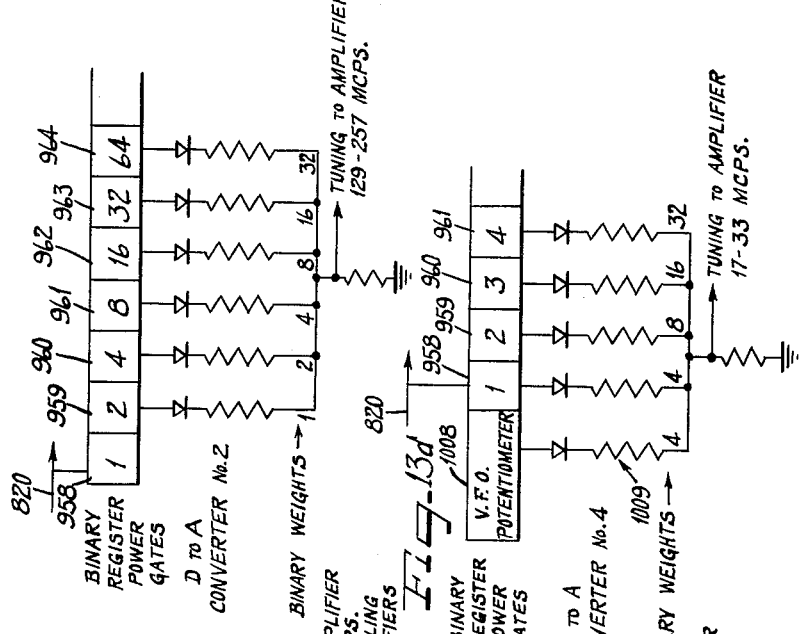
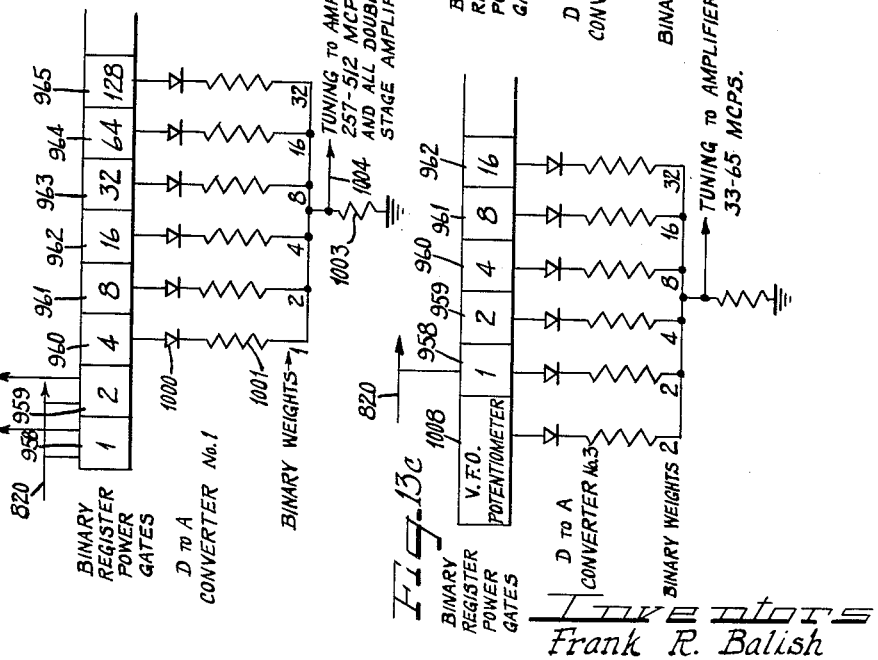
Inventors
Frank R. Balish
Paul H. McGarrell
Charles C. Miller
Arthur F. Naylor
by Hill, Sherman, Meroni, Gross & Simpson Attys Feb. 27, 1962 F. R. BALISH ET AL 3,023,371
PRECISION VARIABLE FREQUENCY GENERATOR
Filed March 7, 1958 17 Sheets-Sheet 14

Fig-16

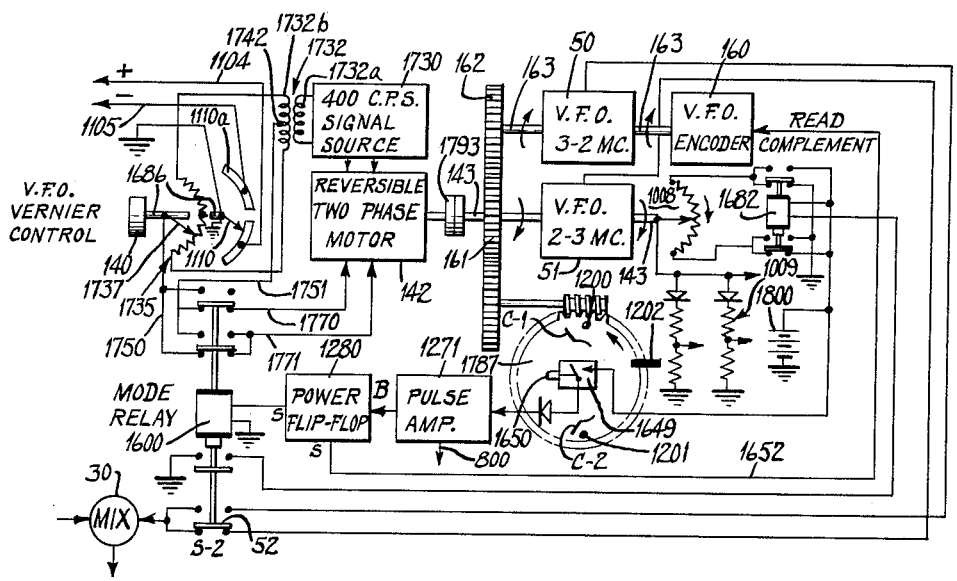

Fig-15a

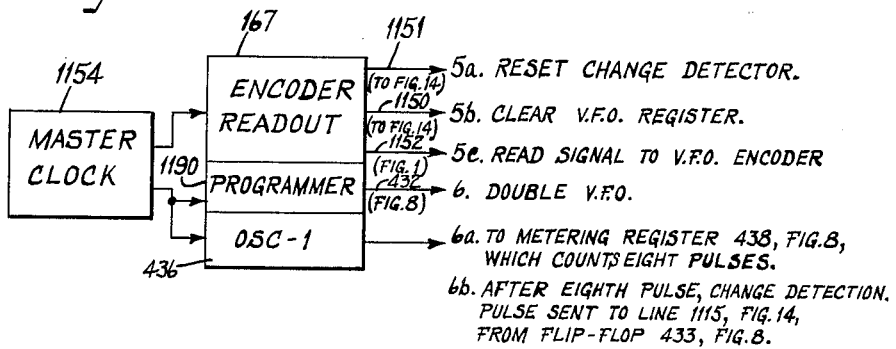

5a. RESET CHANGE DETECTOR.
5b. CLEAR V.F.O. REGISTER.
5c. READ SIGNAL TO V.F.O. ENCODER
6. DOUBLE V.F.O.
6a. TO METERING REGISTER 438, FIG.8, WHICH COUNTS EIGHT PULSES.
6b. AFTER EIGHTH PULSE, CHANGE DETECTION. PULSE SENT TO LINE 1115, FIG.14, FROM FLIP-FLOP 433, FIG.8.

Fig-4a

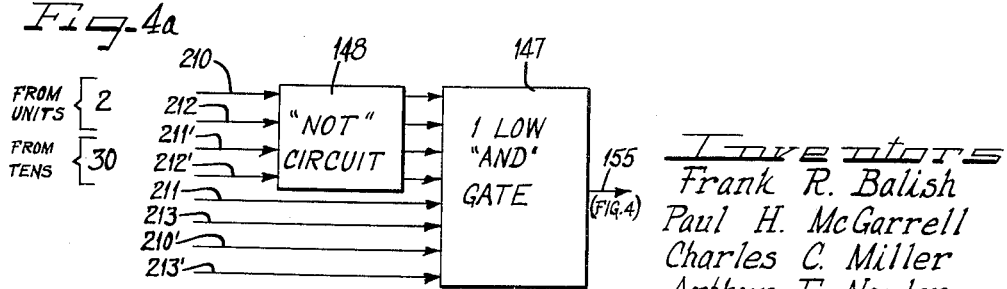

Inventors
Frank R. Balish
Paul H. McGarrell
Charles C. Miller
Arthur F. Naylor
by Hill, Sherman, Meroni, Gross & Simpson Attys

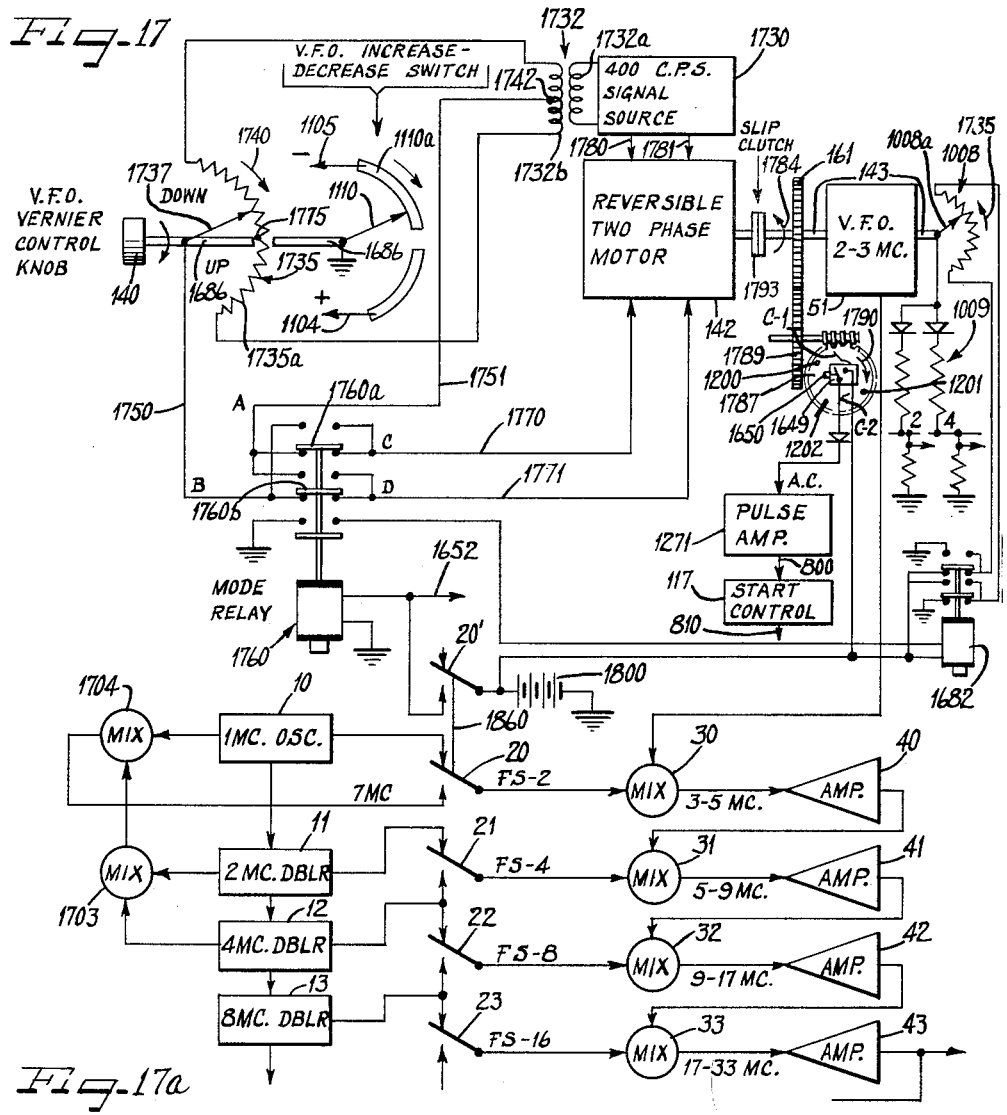
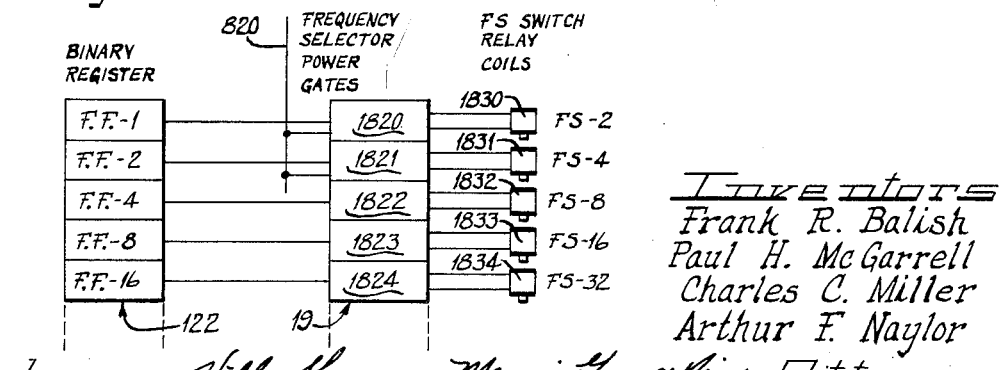

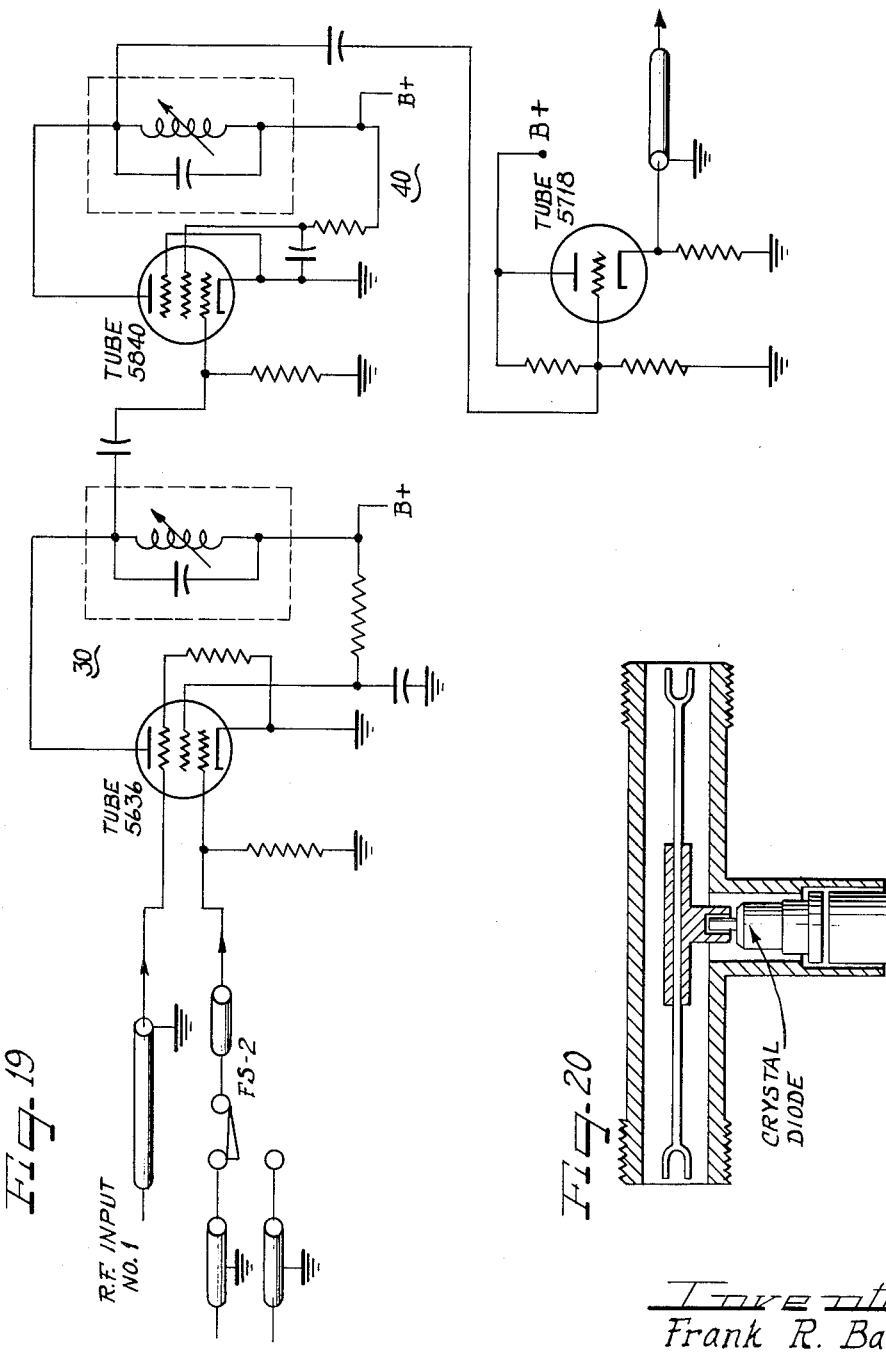

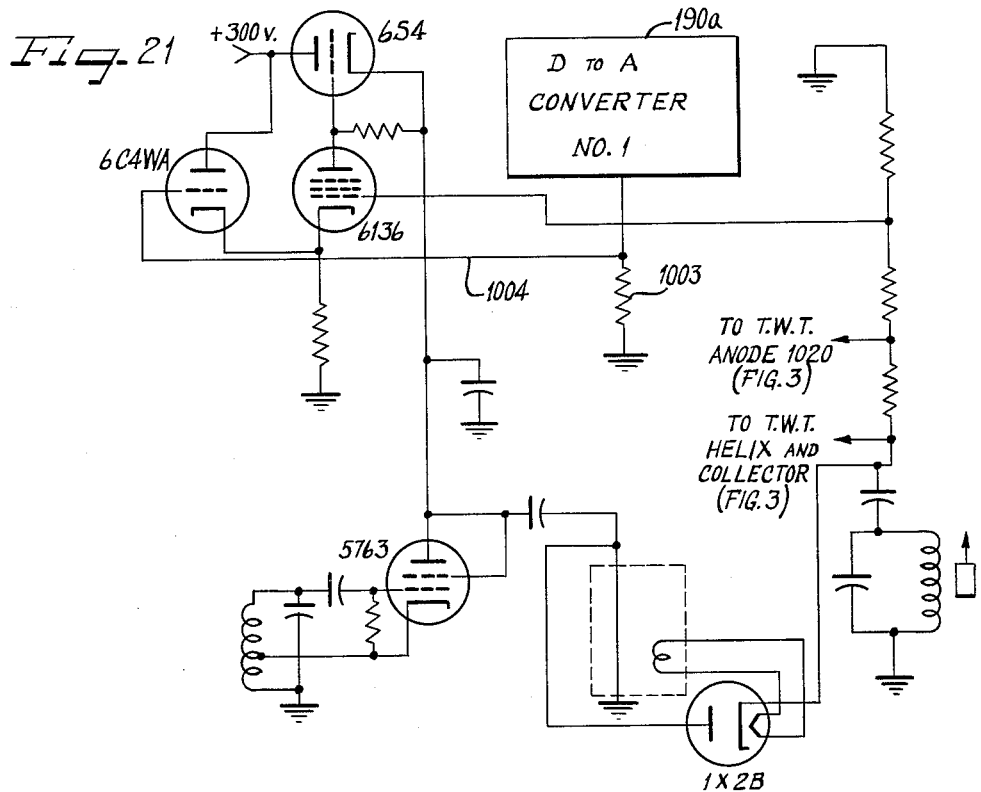
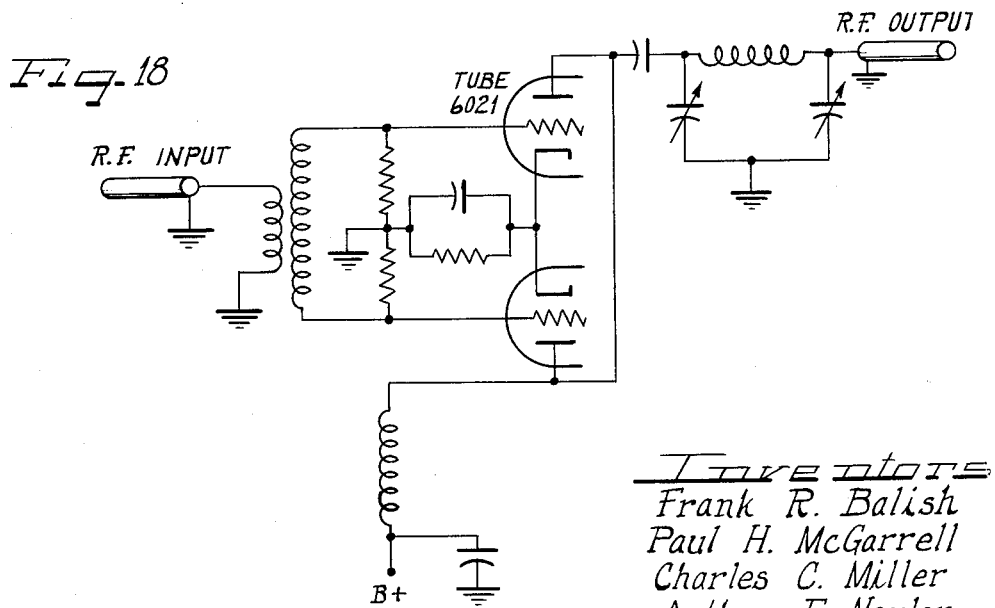

United States Patent Office
3,023,371
Patented Feb. 27, 1962

3,023,371
PRECISION VARIABLE FREQUENCY
GENERATOR
Frank R. Balish, Willoughby, Paul H. McGarrell, South
Euclid, and Charles C. Miller and Arthur F. Naylor,
Cleveland, Ohio, assignors to Thompson Ramo Wooldridge Inc., a corporation of Ohio
Filed Mar. 7, 1958, Ser. No. 719,862
21 Claims. (Cl. 331—38)

This invention relates to a signal generation system and particularly to a precision variable frequency generator for supplying any desired frequency within a given range.

Increasing utilization of the frequency spectrum has given rise to a need for equipment capable of generating a single frequency output upon demand over a very wide frequency range and to a high degree of precision.

Accordingly, it is an important object of the present invention to provide a novel and improved variable frequency generator.

A further object of the invention resides in the provision of a variable frequency generator capable of supplying frequencies over a wide frequency range with great precision and stability.

Another object of the invention is to provide a variable frequency generator which provides extremely simple and rapid frequency selection.

Still another object of the invention is to provide a variable frequency generator of great flexibility which is capable of operation over different portions of the frequency spectrum by the addition or omission of standard components without fundamental change in the basic system.

Yet another object of the invention is to provide a variable frequency signal generator capable of the precise generation of frequencies to the limits of available techniques and circuitry.

Another and further object of the invention is to provide novel combinations of components for the logical control of a variable frequency generator.

Other objects, features and advantages of the present invention will be apparent from the following detailed description, taken in connection with the accompanying drawings, in which:

FIGURE 1 is a block diagram of a variable frequency generator in accordance with the present invention;

FIGURE 2 is a block diagram of the variable frequency oscillator and radio frequency sub-assemblies of the system of FIGURE 1;

FIGURE 3 is a diagrammatic illustration of a suitable tunable amplifier for the system of FIGURE 2;

FIGURE 4 is a block diagram of the control oscillators component of the system of FIGURE 1;

FIGURE 4a (sheet 14) illustrates by way of example the control of the "1 Low" line in FIGURE 4 from the counter of FIGURE 5;

FIGURE 5 is a block diagram of the binary decimal counter component of the system of FIGURE 1;

FIGURE 6 is a block diagram illustrating the binary-decimal to binary converter component of FIGURE 1;

FIGURE 8 is a block diagram illustration of the octave detector, and fallout subtracter components of the system of FIGURE 1;

FIGURE 9 is a diagrammatic illustration of the V.F.O. register component of FIGURE 1;

FIGURE 9a illustrates the manner in which the various inputs to flip-flops 511 and 512 indicated in FIGURE 9 would be isolated in a circuit carrying out the logical diagram of FIGURE 9, this implementation being obvious to those skilled in the art without comment;

FIGURE 10 is a block diagram of the subtract pulser component of FIGURE 1;

FIGURE 11 is a block diagram of the start control component of FIGURE 1;

FIGURE 12 is a block diagram illustration of the range gate and power gate components of the system of FIGURE 1;

Figure 7:
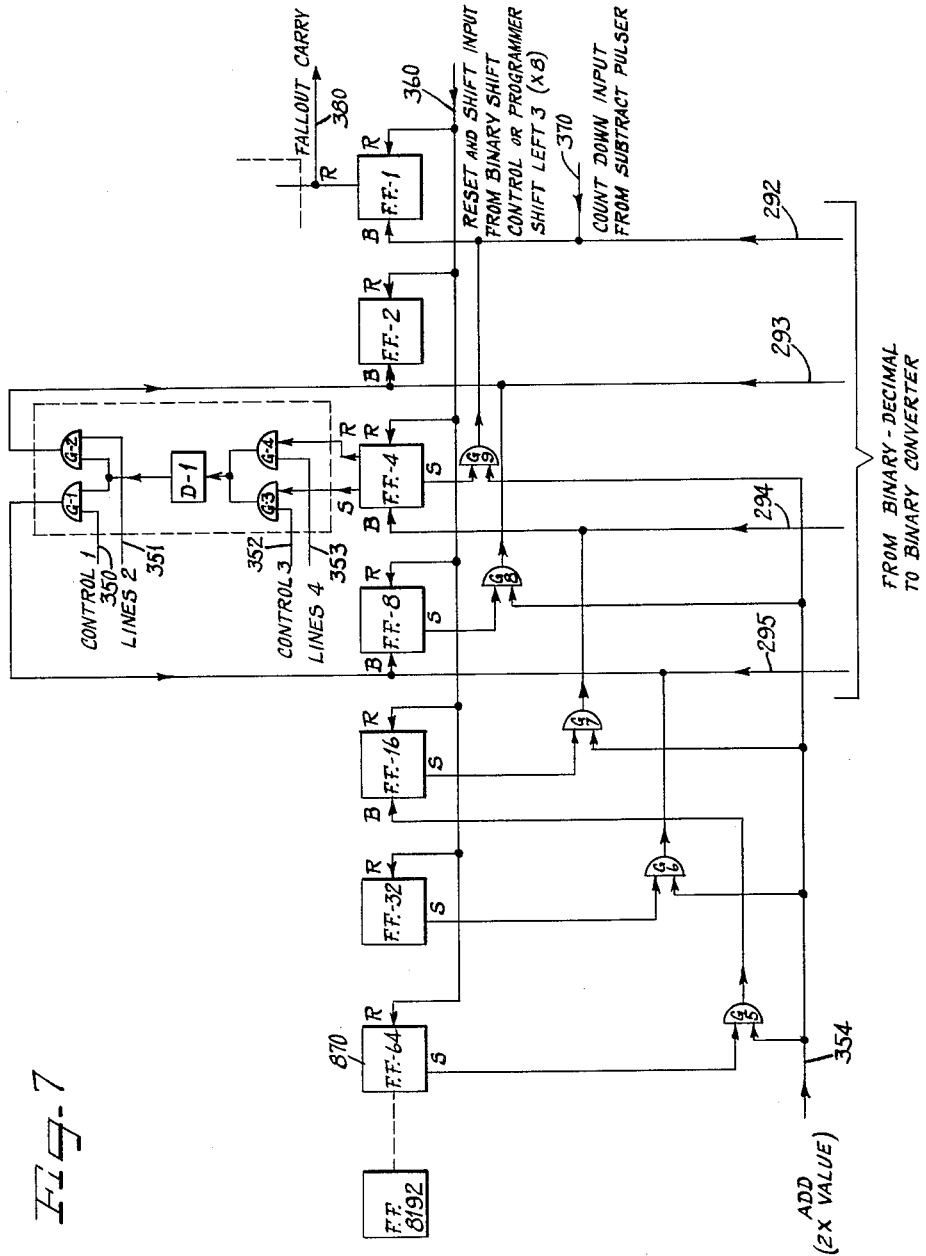
FIGURE 7 is a block diagram showing of the binary register component of the system of FIGURE 1.

FIGURES 13a–d represent diagrammatic illustrations of digital to analog converter components of the system of FIGURE 1;

FIGURE 14 (Sheet 11) is a diagrammatic illustration of the V.F.O. register change detector component of FIGURE 1;

FIGURE 15 (Sheet 3) illustrates the programmer operation for the system of FIGURE 1 in a diagrammatic form;

FIGURE 15a illustrates the operation of the encoder readout component in cooperation with the programmer and oscillator-1 in the illustrated system;

FIGURE 16 is a diagrammatic showing of certain details of the V.F.O. arrangement of the illustrated embodiment;

FIGURE 17 illustrates a modified V.F.O. and frequency selector switch arrangement in accordance with the present invention; and FIGURE 17a illustrates the detailed arrangement of the binary register flip-flops in conjunction with the frequency selector power gates and frequency selector switch relay coils for the embodiments of FIGURES 1–16 or FIGURE 17.

FIGURE 18 illustrates an exemplary R.F. doubler circuit for the input frequency range from 2 megacycles per second to 256 megacycles per second for the system of FIGURE 2;

FIGURE 19 illustrates an exemplary low frequency mixer and octave range tunable amplifier for the system of FIGURE 2;

FIGURE 20 illustrates a typical crystal diode harmonic generator for use as a frequency doubler in FIGURE 2; and FIGURE 21 illustrates a typical travelling wave tube power supply for the system of FIGURE 3.

As shown on the drawings:

It is believed that the system of the present invention will be best understood by first referring to the radio frequency sub-assemblies component of FIGURE 1 which is illustrated in FIGURE 2.

R.F. SUB-ASSEMBLIES

By way of specific example, a variable frequency generator system has been illustrated in FIGURE 2 which would cover a frequency range from 33 to 12,000 megacycles per second. It will be apparent from a consideration of the system that if a generator is desired covering a lesser frequency range, certain components of FIGURE 2 would simply be omitted. Many other variations and modifications will be apparent from the following description.

The illustrated embodiment involves the provision of an oven controlled one megacycle per second crystal oscillator 10, and a series of doubler circuits 11 through 18 connected so that each circuit in the series delivers a frequency twice the preceding circuit. Thus doubler circuits 11 through 18 provide output frequencies of 2, 4, 8, 16, 32, 64, 128 and 256 megacycles per second, respectively.

A series of single-pole double-throw coaxial switches 20–27 control connection of the frequency sources 10–18 with first inputs of a series of frequency mixers 30–37. The output of each of the frequency mixers 30–37 is connected to the input of one of amplifiers 40–47. The outputs of amplifiers 40–46 are connected to second inputs of frequency mixers 31–37, respectively.

The second input of the first frequency mixer 30 is selectively connectible with a pair of variable frequency oscillators 50 and 51 under the control of a single-pole double-throw coaxial switch S–1 designated by reference numeral 52.

A series of frequency doubler circuits 60–64 are arranged in series with tunable amplifiers 70–74 such that the outputs of amplifiers 70–73 are connected to the inputs of doubler circuits 61–64. The input to doubler circuit 60 may be connected either to the output of tunable amplifier 46 or tunable amplifier 47 depending upon the position of single-pole double-throw coaxial switch S–1 which bears reference numeral 77.

Simply by way of example, the generator of FIGURE 2 may be provided with a series of output coaxial cables 80–87. Cable 80 has been illustrated as being connected to the output terminal of a single-pole double-throw coaxial switch 90 having a first input terminal connected to the output of amplifier 44 and a second input terminal connected to the output of amplifier 45. Similarly, cable 81 is selectively connected with the outputs of amplifiers 45 and 46 by means of a coaxial switch 91, cable 82 is connected with the outputs of amplifiers 46 and 47 by means of a coaxial switch 92, and cable 83 is connected to the outputs of amplifiers 47 and 70 by means of a coaxial switch 93, for example.

The frequency mixers 30–37 are arranged to heterodyne the pairs of signals delivered to the respective first and second inputs thereof, and to select the sum frequency for transmission to the input of the associated tunable amplifier. Thus, it will be seen that the mixer 30 is capable of adding either a one megacycle per second signal from source 10 or a two megacycle per second signal from source 11 to a signal between 2 and 3 megacycles per second from the variable frequency oscillator 50 or 51 to provide an output anywhere between 3 and 5 megacycles per second. By the same basic procedure, mixers 31–37 provide outputs in the ranges of 5–9, 9–17, 17–33, 33–65, 65–129, 129–257 and 257–512 megacycles per second. By doubling either the output of amplifier 46 or 47, doubler circuit 60 provides an output between 512 and 1024 megacycles per second. Similarly, doubler circuits 61–64 provide outputs in the ranges 1024–2048, 2048–4096, 4096–8192 and 8192–12,000 megacycles per second, respectively.

Variable frequency oscillators 50 and 51 are connected "back-to-back" so that as one oscillator is being tuned, from 2 megacycles per second to 3 megacycles per second, the other oscillator is being tuned from 3 megacycles per second to 2 megacycles per second. With the tuning shafts of the oscillators 50 and 51 connected in this manner continuous rotation of the tuning knob (not shown) in a single direction will enable frequencies to be delivered to the second input of the mixer 30 which vary progressively from 2.00 megacycles per second to 2.99 megacycles per second, for example, after which by shifting switch 52 continued rotation of the shaft in the same direction will provide frequencies to mixer 30 beginning at 2.00 megacycles per second again. This arrangement has particular utility in an automatic system such as illustrated in FIGURE 1 wherein each time the tuning shaft produces a transition from 2.99 to 2.00, the net output of the system is increased by 1 megacycle per second, thus providing continuous fine tuning of the system by means of the control knob for the variable frequency oscillator components.

The basic purpose of the digital control system illustrated in broad outline in FIGURE 1 is to control the setting of switches 20–27, 52, 77 and 90–97, to produce the desired output frequency. The system of FIGURE 1 is also capable of automatically tuning the various components in accordance with the desired output frequency. The basic digital control system as illustrated in FIGURE 1 will now be described.

BASIC DIGITAL CONTROL

The system for automatically adjusting the components of FIGURE 2 to deliver a desired output frequency from the R.F. sub-assemblies of FIGURE 2 is illustrated in FIGURE 1. Basically the sub-assemblies of FIGURE 2 are controlled by first generating a binary number corresponding to the desired frequency and then utilizing this binary number to actuate suitable logical circuits associated with the components of FIGURE 2. The reference numeral 110 in FIGURE 1 designates a frequency indicator which is preferably designed to give a visual presentation in decimal form of the frequency which the system is programmed to generate. In selecting a frequency to be generated by the system a coarse frequency control knob represented by line 111 in FIGURE 1 is set to cause the binary decimal counter 113 to count up or down through the medium of control oscillators 115. The counting in counter 113 causes a corresponding change in the integral number displayed by frequency indicator 110. When the number shown by the frequency indicator 110 corresponds to the desired frequency, control 111 is returned to its off position to cause start control 117 to initiate operation of the binary-decimal to binary converter 120. This action first presets binary register 122 to an offset frequency (or the complement of that value) from the offset frequency preset component 124. The binary-decimal to binary converter 120 then converts the contents of the binary-decimal counter 113 into a straight binary code. The result is added to the preset value in the binary register 122. By this means the offset frequency is added or subtracted from the desired frequency.

Octave detector 130 now examines the contents of the binary register 122 to determine the octave number, $n$ (where $n$ equals 0 for a desired frequency below 512 megacycles per second, $n$ equals 1 where the desired frequency is in the range between 512 and 1024 megacycles per second, $n$ equals 2 where the desired frequency is in the range between 1024 and 2048 megacycles per second, $n$ equals 3 where the desired frequency is in the range between 2048 and 4096 megacycles per second, and $n$ equals 5 where the desired frequency is between 8192 and 12,000 megacycles per second).

After the approximate frequently desired has been obtained by means of the coarse frequency control 111 as indicated by the number appearing at the frequency indicator 110, vernier frequency control knob 140 is rotated in the proper direction for fine adjustment of the desired frequency. Rotation of vernier control 140 causes a motor 142 to drive a shaft 143 in a corresponding direction to increase or decrease the setting of variable frequency oscillators 50 and 51 represented by component 150 in FIGURE 1.

V.F.O. encoder 160 is suitably coupled to shaft 143 as by means of gears 161 and 162 and shaft 163 and provides a digital code representation of the angular position of shaft 143. The encoder is read on a continual basis under the control of an encoder readout 167.

A doubling control output from octave detector 130 causes the reading of the V.F.O. encoder 160 to be doubled $n$ times and the result to be placed in the V.F.O. register 170. Subtract pulser 173 now converts the integral number in the V.F.O. register 170 to a series of pulses which are subtracted from the binary register 122 by counting that register down. The part of the product in the V.F.O. register 170 corresponding to the digits to the right of the decimal point is displayed in the frequency indicator 110.

The contents of the octave detector 130 are now used again to divide the number in the binary register 122 by 2 to the superscript $n$. If there is a remainder to this division, fallout subtracter 180, under the control of the octave detector 130 and the binary register 122, converts this remainder to a train of pulses which are subtracted from the binary decimal counter 113.

If a remainder did exist, it is necessary to transfer the new setting of the binary decimal counter 113 to binary register 122 and again examine the number in the binary register to determine the octave number $n$, since the remainder subtraction might have put the command frequency in the next lower octave. The process of doubling the V.F.O. reading $n$ times and subtracting the integral V.F.O. number from binary register 122 and dividing the number in the binary register by 2 to the superscript $n$ is now repeated. One and only one repeat is ever necessary even where remainder subtraction places the command frequency in the next lower octave.

During the above process the start control 117 has disabled digital to analog converters 190, frequency selector power gates 191 and output switch power gates 192. The frequency output has been turned off during the conversion process by virtue of the fact that the output switch power gates 192 have been disabled.

When the conversion process is completed, the frequency selector power gates 191 cause switches 20–27 of FIGURE 2 to assume positions corresponding to the number in the binary registers 122. Simultaneously the digital to analog converters 190 supply tuning voltages to amplifiers 40–47 and 70–74 of FIGURE 2, and the output switch power gates cause one of the output switches 90–97 to make the proper connection. The R.F. sub-assemblies including the components shown in FIGURE 2 are represented by the reference numeral 195 in FIGURE 1.

The frequency now being generated is indicated in part by the contents of the binary decimal counter 113 and in part by the V.F.O. register 170. The V.F.O. encoder 160 is continually re-read by the encoder readout 167. At each reading, the encoder output is doubled $n$ times under the control of the octave detector 130 and the result appears in the V.F.O. register 170. As the V.F.O. setting is varied by means of the fine control 140, the change appears in the V.F.O. register 170 and the frequency indicator 110. When the V.F.O. register 170 changes by one megacycle per second, the binary decimal counter 113 is increased or decreased by the V.F.O. register change detector 197. It is important to note that in any of the doubling ranges, this change does not necessarily mean that switches 20–27 of FIGURE 2 have to be changed. For instance, in the highest doubling range where $n$ equals 5, the effective V.F.O. contribution to the output frequency varies from 64 to 127.36 megacycles per second (64 times 1.00 to 64 times 1.99). Therefore the V.F.O. component 150 can change the output frequency about 63 megacycles per second in this range with no change in the frequency selector switch positions. The only time a conversion process has to be initiated is when the V.F.O. component 150 reaches its end limits. At these points an input indicated by line 800 in FIGURE 1 is introduced into the start control 117. As the fine control 140 causes the V.F.O. component 150 to reach either of these end limits, the output frequency will be interrupted for a negligible period of time while a conversion process takes place.

CONTROL OSCILLATORS

The function of the control oscillators shown in detail in FIGURE 4 is to provide a convenient means of coarse frequency selection over a wide range of frequencies. The selection is ot be accomplished by counting the binary decimal counter up or down until the desired frequency is reached. A slow, medium and fast rate of counting for each range is incorporated into the digital control system. The tabulation below gives the pulse frequencies for the slow, medium and fast rates for each of the ranges.

|    | Range, mc.     | Slow, c.p.s. | Medium, c.p.s. | Fast, c.p.s. |
|----|----------------|--------------|----------------|--------------|
| 1  | 33 to 129      | 4            | 40             |              |
| 2  | 65 to 257      | 4            | 40             | 100          |
| 3  | 129 to 512     | 4            | 40             | 100          |
| 4  | 257 to 1,024   | 4            | 40             | 400          |
| 5  | 512 to 2,048   | 4            | 40             | 400          |
| *6 | 1,024 to 4,096 | 4            | 40             | 100          |
| *7 | 2,048 to 8,192 | 4            | 40             | 400          |
| *8 | 4,096 to 12,000| 4            | 40             | 400          |

It will be noted that no fast rate is provided for range 1. Asterisks indicate that the count pulses are fed into the tens decade of the binary decimal counter rather than the units decade. With this arrangement, a desired frequency selection in any range can be changed from the low end of the range to the high end in a maximum of about 4¼ seconds. With reference to FIGURE 4, it is assumed that the range information is fed into the circuit via eight wires 920–927, a selected range being indicated by its associated line being energized through selector switch arm 145 from a suitable voltage source 146. The operator may manually select the desired range by means of selector arm 145.

Four free running multivibrators (MV) 131–134 provide the necessary counting pulse rates. As shown in the tabulation, the 4 and 40 cycle per second frequencies are employed as the slow and medium rates for all ranges. By means of buffer 136 work ng into gate G–17 of FIGURE 4 and buffer 137 working into gate G–18 of FIGURE 4, the proper multivibrator output for the fast rate is chosen for each range. (No fast rate is required for range 1 as previously stated.) The outputs are connected to the coarse control switch 111 as shown. This switch can take any convenient form such as a rotary selector switch or a multiple push button arrangement as desired. Man pulation of switch 111 causes a selected pulse rate to be routed to either the plus line 138 for counting up or the minus line 139 for counting down, depending on whether an increase or decrease of desired frequency has been called for. Pulses on these lines are connected to respective gates G–1 to G–8 and G–9 to G–16 of FIGURE 4, there being a total of 16 gates of which 8 are actually shown. The other two inputs to the gates are the range control lines 920–927 of which lines 920, 924, 925 and 927 are actually shown and the limit control l nes of which 151–154 and 155–158 are indicated in FIGURE 4.

The high and low limit control lines for each range are actuated by signals derived from the binary decimal counter of FIGURE 5. For example, if it is desired to disable the "1 Low" gate G–9 below 33 megacycles, a coinc dence or "and" gate 147, FIGURE 4a, may be provided which will be disabled when the set output of the binary decimal counter of FIGURE 5 is 32. This number corresponds to a 2 in the units decade and a 3 in the tens decade in excess three binary code. Single primed reference numerals 210′–213′ designate the parallel output lines of the tens decade of the binary decimal counter of FIGURE 5 corresponding respectively to the lines 210–213 of the units decade. All eight output lines are shown in FIGURE 4a, although line 213' would not normally bear a set voltage when lines 211' and 212' were both in a set condition, for example, and thus its connection to gate 147 could be omitted.

Simply by way of example, if lines 210, 212, 211' and 212' have a relatively high voltage condition when the associated flip-flops are in set condition, "not" circuit 148 may provide relatively low voltages to "and" gate 147. With low voltages at all eight inputs to "and" gate 147, line 155 may have a relatively low voltage to disable gate G–9. When any of the eight inputs to the "and" gate is a relatively high voltage, the output to line 155 will be a relatively high enabling voltage.

In operation, a given range line such as 920 is energized to enable the corresponding gate such as G–1 in FIGURE 4 in the plus group and one gate such as G–9 in the minus group. The enabled gate in the plus line will continue to pass its input count until the binary decimal counter reaches the high limit frequency for the selected range. The high limit control "and" gate similar to gate 147 shown then holds the gate G–1 disabled to prevent further increase of the counter. The selected gate such as G–9 in the minus group performs a similar function to set the low limit of the range.

The change pulses for ranges 6, 7 and 8 are connected into the tens rather than the units decade of the binary decimal counter of FIGURE 5. To effect this connection, the outputs of gates 6, 7 and 8 in the plus line are grouped together as indicated by dash line 159 and their outputs taken to the tens decade input via line 164. The outputs of gates 1 through 5 are connected to the units decade via line 165 as indicated by dash line 168. A similar grouping of gates in the minus line is made as indicated by dash lines 171 and 172 and output lines 174 and 175.

BINARY DECIMAL COUNTER

The binary decimal counter shown in FIGURE 5 is required to count forward and in reverse, and to provide parallel outputs. An excess three binary decimal code is utilized in this component. FIGURE 5 shows the logic involved in one decade of this counter. The preset input lines 200–203 are used to set the count to approximately the middle of the range after the equipment is turned on. This is made available from range information. A similar preset action is employed as ranges are changed during operation. To understand the operation of the decade of FIGURE 5 in the forward direction, only four flip-flops FF–1, FF–2, FF–4 and FF–8 and gates G–1, G–2, G–5, G–7 and G–9 need be considered. The remaining gates do not enter into the forward count condition because the incoming plus count pulses, for example from line 165 of the control oscillators circuit of FIGURE 4, only control the coupling gates G–2, G–5, G–7 and G–9. The incoming count pulses are wide compared to the switching time of the flip-flops. This insures that gates G–2, 5, 7 and 9 are enabled long enough to allow any reset output to be coupled to the binary input of the following flip-flop. Differentiators 206 and 207 provide triggering pulses. In the excess three code, a zero is encoded as a 2 and a 1. The counter operates in a straight binary fashion until 9 pulses have been counted. At this time, flip-flops FF–4 and FF–8 are in set condition. Since this is a decade the tens pulse must return the counter to the starting condition with FF–1 and FF–2 in set condition. Gate G–1 operates to perform this function.

In the reverse mode of this counter, consideration need be given only to flip-flops FF–1, FF–2, FF–4 and FF–8 and gates G–3, G–4, G–6, G–8 and G–10. Starting at zero, the first pulse, for example from minus line 175 of the control oscillators circuit of FIGURE 4, must set the decade to 9 which in the excess three code requires FF–4 and FF–8 to be set. Thus, starting at zero with FF–1 and FF–2 set and FF–4 and FF–8 reset, the first pulse will reset FF–1, actuating gate G–4 to reet FF–2 and set FF–4 and FF–8. Successive minus pulses cause the counter to count downwardly as will be apparent from a consideration of FIGURE 5.

The four parallel output lines of each decade such as 210–213 in FIGURE 5 are connected to the transfer gates in the binary-decimal to binary converter. These outputs are also used to provide indication of the number stored in the counter and to provide information for the high and low limit controls. In the illustrated embodiment, five decades are required. Output lines 164 and 174 from the control oscillators circuit of FIGURE 4 have been indicated in FIGURE 5 as connecting directly to the input of the tens decade through differentiators 216 and 217. Suitable means are indicated at 220 and 221 for preventing direct actuation of the tens decade from line 165 or 175 through differentiators 216 or 217.

BINARY-DECIMAL TO BINARY CONVERTER

Information is transferred from the binary decimal register of FIGURE 5 to the binary register of FIGURE 7 by means of the binary-decimal to binary converter shown in FIGURE 6. As illustrated in FIGURE 6, the information is transferred from the binary decimal register output lines such as 210–213 in FIGURE 5 to transfer gates such as 250–253 of the converter of FIGURE 6.

A simple programmer 1190, FIGURE 15, provides input pulses to line 256 for delivery to a converter counter 257. As successive pulses are delivered to the counter 257, the counter counts in normal binary fashion to provide settings corresponding to counts of 1 through 7. Counts of 1 through 5 are represented as outputs of $1\overline{2}\overline{4}$, $\overline{1}\overline{2}\overline{4}$, $12\overline{4}$, $\overline{1}24$ and $1\overline{2}4$. It will be seen in FIGURE 6, that these successive outputs from counter 257 will successively enable gates G–1, G–2, G–3, G–4 and G–5. Thus, the information in the binary decimal register of FIGURE 5 is transferred to the binary-decimal to binary converter in steps, decade by decade, beginning with the highest valued decade.

With respect to the units decade shown in FIGURE 5, the condition of flip-flops FF–1, 2, 4 and 8 will appear at the output lines 270–276 of buffer-1 and negator 280 when gate G–5 is enabled by counter 257. Thus, if FF–1 in FIGURE 5 is in reset condition, output line 270 will deliver a $\overline{1}$ signal and if FF–1 is in set condition, output line 271 will deliver a 1 signal. Similarly, for FF—2 and FF–4. For FF–8, a signal will appear at output line 276 if FF–8 is set. If FF–1 is in reset condition, FF–2 in reset condition, FF–4 in set condition and FF–8 in reset condition, gate G–6 of buffer-2 will be actuated to actuate the 1 output line 292 to the binary register. Similarly when gate G–7 is enabled (corresponding to a 5 in the excess three code) output line 293 is actuated which transmits a 2 signal in straight binary form. If gate G–8 is enabled, both lines 292 and 293 are actuated. If gate G–9 is enabled, output line 294 of buffer 290 is actuated to register a 4 in the binary register. If gate G–10 is enabled, output lines 292 and 294 are actuated; if gate G–11 is enabled, output lines 293 and 294 are actuated; if gate G–12 is enabled, lines 292, 293 and 294 are energized; if gate G–13 is enabled, output line 295 is actuated representing an 8 in straight binary code; and if gate G–14 is enabled lines 292 and 295 are actuated to transmit a 9 in straight binary code to the binary register. The gates G–6 to G–14 thus decode a single digit of binary excess three code into a straight binary code. The straight binary outputs from the several gates are buffered together to form a single set of straight binary outputs which represent one decade of information.

BINARY REGISTER

FIGURE 7 illustrates the binary register for the system of FIGURE 1. It should be noted that gates G–1 through G–4 and delay D–1 along with the associated circuitry are required for each of flip-flops FF–1 through FF–8192, inclusive. Also a gate such as G–5 for FF–64, G–6 for FF–32, gate G–7 for FF–16, G–8 for FF–8 and G–9 for FF–4 is required for each flip-flop of the series except FF–2 and FF–1.

Input information is obtained from four sources, the programmer via lines 350–354, the binary-decimal to binary converter via lines 292–295, the binary shift control via line 360 and the subtract pulser via line 370.

Information is obtained from the binary-decimal register of FIGURE 5 via the binary-decimal to binary converter of FIGURE 6, decade by decade, and presented in straight binary form in the binary register of FIGURE 7 using the following formula:

$$\{[(A\times 10+B)10+C]10+D\}10+E$$

where A, B, C, D and E are the respective straight binary numbers of the decades with A derived from the highest order decade. During this entire conversion process control lines 350 and 353 are energized. The binary-decimal to binary converter of FIGURE 6 feeds the information, decade by decade to the first four flip-flops FF–1 to FF–8 of the binary register.

The programmer after each decade information transfer from the converter of FIGURE 6 to the binary register of FIGURE 7, pulses the reset and shift input 360 times. Since this input 360 is tied to the reset input of every flip-flop in the series, this scheme effectively transfers the information in each flip-flop to the left three places in the series of flip-flops (multiplication by 8) using gates G–1 and G–4 and delay D–1 in the process. By way of example, if FF–4 is in set condition due to an input received from line 294, the first reset pulse will cause a signal to be transmitted to gate G–4 and after a delay in D–1 the signal will be transmitted by gate G–1 to the input to flip-flop FF–8. In view of the delay in D–1, FF–8 will then be in set condition in correspondence with the set condition of FF–4 prior to the reset pulse. On the other hand, if FF–4 is initially in reset condition, a reset pulse will have no effect on FF–4, so that FF–8 will necessarily be in reset condition at the end of the first reset pulse in correspondence with the reset condition initially in FF–4.

The add (2x value) pulse at line 354 is delivered to the gates such as G–5 to G–9 after the three reset pulses. Any of these gates which are enabled by the corresponding flip-flops being in set condition transmit the add pulse to the flip-flop to the right two units and effectively add two times the original number in the register to the eight times value (this being the accumulate operation). The number now in the binary register is ten times the number previously placed in the register. This procedure executes the formula given above and completes the conversion from binary decimal excess three to straight binary code.

Control lines 350 and 353 associated with each flip-flop are now de-energized. Control lines 350 and 352 are energized by the programmer sequence during subtraction of the multiplied integral V.F.O. number from the number in the binary register. Pulses from the subtract pulser of FIGURE 10 are introduced at 370 into the binary input of the first flip-flop FF–1 and cause the subtraction (one per pulse) to take place in the binary register. This is the count down operation.

The shift right operation is performed when signals from the binary shift control appear at line 360 while control lines 351 and 353 are in actuated condition under the control of the programmer. Each pulse received by the shift input line 360 from the shift control under these conditions causes the register information to shift to the right one bit or flip-flop position in the series of flip-flops. Each shift to the right represents a division by two. Deactivation of control lines 351 and 353 is called for by the programmer after this process is ended.

During the shift right operation, any reset of FF–1 is termed a "fallout carry" and is delivered from the binary register via output line 380.

OCTAVE DETECTOR

The octave detector of the system of FIGURE 1 is illustrated in FIGURE 8 and has the function of determining the number of the doubling octave ($n$). This function is required whenever the coarse frequency control 111 in FIGURE 4 is reset to the off position or when required by the V.F.O. A change of octave occurs when using the V.F.O. control only when the actual V.F.O. setting changes from .99 to .00 or vice versa. This insures continuous frequency tracking.

The following table represents octave ranges ($n$) as a function of output frequency.

| Frequency: | Octave indication |
|---|---|
| Below 512 mc. | 0 |
| 512 to 1024 | 1 |
| 1024 to 2048 | 2 |
| 2048 to 4096 | 3 |
| 4096 to 8192 | 4 |
| Above 8192 mc. | 5 |

Octave sensing is accomplished by checking the setting of flip-flops FF–512 through FF–8192 when the programmer pulse for octave detection is delivered to line 400 in FIGURE 8. Gates G–1 through G–5 of the octave detector, if enabled by the condition of flip-flops FF–512 through FF–8192, yield a pulse into buffer 410. These are properly transmitted by the buffer 410 to the correct bit or bits of the octave detector register 420 which now holds the number $n$.

It will be seen from FIGURE 8 that if gate G–1 is enabled output line 412 of buffer 410 is actuated to register the number 1 in octave detector register 420. If gate G–2 is enabled, output line 413 of buffer 410 is actuated. If gate G–3 is enabled, output lines 412 and 413 are both actuated to register the number three. If gate G–4 is enabled, output line 414 of buffer 410 is actuated, and if gate G–5 is enabled, lines 412 and 414 are actuated. It will be observed that if the highest flip-flop in set condition in the binary register of FIGURE 7 is FF–512, then gate G–1 will be enabled; if the highest flip-flop is FF–1024, then gate G–2 will be enabled; if FF–2048 is the highest, gate G–3 will be enabled; if FF–4096 is the highest, gate G–4 will be enabled; and if FF–8192 is in set condition, gate G–5 will be enabled.

The odd-even control flip-flop 430 in FIGURE 8 and the one bit 420a of register 420 contain the same knowledge at this point.

The octave detector thus determines the octave location of the number in the binary register for use in further computations.

Contained in the odd-even control flip-flop 430 is necessary continuous information for the output switches.

V.F.O. REGISTER

The excess three binary decimal code as read by the V.F.O. encoder is registered every two milliseconds in two decades of the V.F.O. register by means of lines 460–463 and 470–473 from the encoder. When it becomes necessary to compute the effective frequency of the V.F.O. at the output of the generator, the encoder input to the register is stopped. It should be noted that the reset procedure adds a one in the units decade to satisfy the system logic. The octave detector pulses generated at line 500 in FIGURE 8 are fed sequentially to the register as indicated in FIGURE 9. Each pulse serves to double the number that is in the register. Thus, a pulse from the octave detector is applied in parallel to the reset inputs of the four flip-flops of each decade designated 511–514, 521–524, 531–534 and 541–544 in FIGURE 9. Because the binary code employed is decimal excess three and because of the delays introduced by delay components 551–553, 561–563, 571–573 and 581–583 which are interposed between the output of each flip-flop and the input of the next succeeding flip-flop in each decade, the reset pulse introduced at line 500 doubles the number in each decade. This process will produce in each decade a number which is twice that of the original number plus or minus three depending upon whether or not the sum produced in the decade is less than ten or not. In effect, the sum is three above the excess three code if no carry pulse is present at the 8 bit flip-flop (514, 524, 534 or 544) of the decade, and the sum is three below the excess three code if a carry pulse is present. To effect correction of the codes, gates G–1 and G–2 are employed for the hundredths decade, gates G–3 and G–4 are employed for the tenths decade, gates G–5 and G–6 are associated with the units decade, and gates G–7 and G–8 are associated with the tens decade. If there are no carry pulses from the respective decades, the associated flip-flops 600–603 remain reset so that gates G–2, G–4, G–6 and G–8 are enabled and gates G–1, G–3, G–5 and G–7 are disabled. The pulse from the octave detector via line 500 is delivered by line 610 to delay 620. From delay 620, after the input from the encoder has been registered, the pulse from the octave detector passes through gates G–2, G–4, G–6 and G–8 to subtract three from the associated decade registers (by adding the 16 complement).

If there has been a carry from the decades, flip-flops 600–603 are set and gates G–1, G–3, G–5 and G–7 are enabled rather than gates G–2, G–4, G–6 and G–8. Now the delayed pulse from delay 620 adds three to the decades by means of gates G–1, G–3, G–5 and G–7. This computation occurs simultaneously in all of the decades, but of course in general some decades will have carry pulses while other decades will not. If there has been a carry pulse from any of the decades, the add three pulse which passes through the corresponding gate G–1, G–3 or G–5 to add three to the decade, also is applied through a delay 630, 631 or 632 to flip-flop 521, 531 or 541 of the succeeding decade. Thus, this succeeding decade is increased by one.

The reset signal for flip-flops 600–603 is derived from the output of delay 620, and the reset action is delayed by delay 640 so that the reset does not occur before the last carry may appear. After flip-flops 600–603 have been reset, the register is ready for the next pulse from the octave detector via line 500. There may be from zero to five pulses from the octave detector which means that the V.F.O reading may be left unchanged or increased by a factor of 2, 4, 8, 16 or 32 by means of this doubling operation of the V.F.O. register.

The set outputs of the flip-flops 511–514 in the hundredths decade and 521–524 in the tenths decade are taken to the frequency indicator 110 for display as indicated in FIGURE 1. The reset outputs of the flip-flops 531–534 and 541–544 in the units and tens decades are used by the subtract pulser shown in FIGURE 10.

The register must be cleared prior to each reading of the V.F.O. encoder whether or not the computation has been accomplished by the register. This clear is effected by applying a clear signal to reset input of all register flip-flops except the 4-bit flip-flop 533 of the units decade. The clear signal is applied to the set input of flip-flop 533. This exception is made because the encoder output signal is always effectively 1.00 to 1.99 megacycles per second and flip-flop 533 alone represents 1 in the excess three binary code.

FIGURE 15a illustrates an exemplary sequence of operation in the absence of a conversion cycle. Master clock 1154 synchronizes the various outputs of the components 167, 1190 and 436 (shown also in FIGURE 8), to follow the sequence from 5a to 6b illustrated at predetermined intervals. When a "start conversion" signal is received by programmer 1190, FIGURE 15, synchronism is maintained as by delaying the beginning of steps 1–5 until the clock will automatically initiate steps 5a, 5b and 5c, FIGURE 15a, between steps 5 and 6 of FIGURE 15. Of course gate 1120, FIGURE 14, disables the change detector during a conversion cycle. At the end of the conversion cycle, steps 5a to 6b of FIGURE 15 continue as previously.

SUBTRACT PULSER

At the direction of the programmer by means of input line 700, the subtract pulser must provide a series of pulses equal in number to the integral value of the effective V.F.O. frequency to be counted down from the binary register of FIGURE 7. The operation is accomplished with the logical circuitry illustrated in FIGURE 10.

With the "subtract integral V.F.O." pulse from the programmer, the reset outputs of the units and tens decades of the V.F.O. register of FIGURE 9 are applied through transfer gates 710–717 to the reset inputs of flip-flops 720–727 which have previously all been set. In this manner, the codes which were present in the V.F.O. register decades are transferred to flip-flops 720–727. At this time, no pulse appears at the output of gate 730 or 731 because there is no possible code which can provide inputs to the 1, 4 and 8 bits simultaneously.

Now, by pulsing the binary input of flip-flop 720 until a carry pulse is produced at the set output of flip-flop 727, a count equal to the number represented by the units and tens decades of the V.F.O. register can be determined because the counter depicted counts in reverse in the same manner as the binary-decimal counter of FIGURE 5. The gates 730 and 731 are used to implement this count down.

In operation, after a delay to allow transfer of the V.F.O. register decade information into the counter, flip-flop 740 is set enabling gate 742. The delay is illustrated as being introduced by component 745 in FIGURE 10. With gate 742 enabled, the output of oscillator 750 transmits pulses to the counter via line 760. The oscillator pulses from gate 742 are also available from gate 762 and the pulses appearing at this point are applied to the binary register via line 370 for count down. Gate 762 is used because the counter requires one more pulse than the number set into it to produce the output carry. The first pulse from the oscillator 750 is delayed at 770 so that flip-flop 772 does not set soon enough to allow the pulse to pass through gate 762.

Thus, the correct number of pulses is subtracted from the binary register. Flip-flop 772 is reset by the terminating output pulse from flip-flop 727. When the subtract pulser is cleared, the clear signal is applied to the set inputs of flip-flops 720–727.

BINARY SHIFT CONTROL

The binary shift control is shown operatively associated with the octave detector in FIGURE 8 and serves to supply shift signals to the binary register indicated diagrammatically at 122 in FIGURE 8 and shown in detail in FIGURE 7. The binary shift control also provides the doubling pulses via line 500 to the V.F.O. register shown in FIGURE 9. However, in the programmed logic, these operations of the binary shift control cannot be simultaneous. Flip-flop 431 shown in FIGURE 8 channels the signals to the binary register via line 360 or to the V.F.O. register via line 500.

Upon a signal from the V.F.O. readout control via line 432, flip-flop 433 is set enabling the gate 435 so that the output of oscillator 436 is applied to the metering register 438 and the octave detector register 420. After eight counts, the metering register 438 provides a carry pulse which resets flip-flop 433, effectively turning off the pulses from the oscillator 436. Flip-flop 440 will be set by a carry pulse from the octave detector register 420 after a number of pulses equal to eight minus the octave number, $n$. The set output of flip-flop 440 enables gate 441 so that the balance of the eight metered pulses can pass to gates 442 and 443. In this case (without the binary register shift signal which arrives via line 445), gate 442 is enabled because flip-flop 431 is reset, and a number of pulses equal to the octave number is transmitted to the V.F.O. register via line 500 for doubling operation. When shift signals are desired, the flip-flop 431 is set by the binary register shift signal from line 445. Gate 443 is now enabled and the pulses counting the shifts of the binary register are routed to the binary register via line 360. At the completion of the eight count from the metering register 438, flip-flop 431 is reset so that the next set of octave indicating pulses are routed to the V.F.O. register via line 500.

FALLOUT SUBTRACTER

If, upon shifting the binary register shown in FIGURE 7 for division by powers of two ($2^n$ where $n$ is the octave number) there is a remainder, the fallout carries via line 380 resulting must subtract from the binary decimal counter of FIGURE 5 a number equal to that remainder. The line 447 in FIGURES 5 and 8 illustrates the connection between the fallout subtracter and the binary decimal counter.

At the time when the first shift pulse is applied to the binary register, the octave detector register 420 reads "one," and gate 448 is enabled. If there is a fallout carry after the first register shift in the binary register, one count must be subtracted from the binary decimal counter. The fallout carry from line 380 will set flip-flop 449 so that gate 450 allows the pulses from oscillator 451 to be supplied to line 447. Because gate 448 is enabled, the first pulse through gate 450 will reset flip-flop 449 via line 452, and only one pulse passes to the binary decimal counter to be subtracted. At the second shift, gate 453 is enabled by the octave register 420. If there is a fallout, the pulses through gate 450 will be counted by flip-flop 454, and two pulses will pass to the binary decimal counter via line 447. In the same fashion, when the octave register 420 reads "five" and the 16-bit of the binary register, FF-16, is shifted out, if the 16-bit flip-flop is set, it will require sixteen pulses to count through flip-flops 455, 456, 457 and 454 with gate 458 enabled before flip-flop 449 is reset and the pulses to the binary decimal counter are stopped. The fallout subtracter of FIGURE 8 can, therefore, provide from 0 through 31 pulses to the binary decimal counter of FIGURE 5, and upon completion of the count, all flip-flops of the fallout subtracter are in the desired reset condition.

START CONTROL

The start control illustrated in FIGURE 11 initiates the re-determination of the frequency generator switch positions and indicated frequency. This type of action is required when the V.F.O. setting passes through a transition from .00 to .99 or from .99 to .00 or when the coarse control switch 111 returns to its normal position after usage.

A V.F.O. transition appearing at line 800 causes one complete programmer timing schedule. The coarse control switch diagrammatically at 111 in FIGURE 11 initiates two such schedules, although only one is required unless fallout subtraction changes the octave number.

In operation of the start control, gate 802 is enabled by a D.C. voltage from line 803 through switch 805 which is closed whenever the coarse control switch 111 is in off position corresponding to the position shown in FIGURE 4. When a V.F.O. transition occurs, flip-flop 807 is set. The set output initiates a start conversion signal along line 810 and also causes the switch power gates indicated at 191 and 192 in FIGURE 1 and the digital to analog converters indicated at 190 in FIGURE 1 to be inoperative by means of line 820. An "end conversion" pulse passes through gate 822 enabled by the reset output of flip-flop 824 and resets flip-flop 807.

FIGURE 11 also indicates how flip-flop 824 converts a single "end conversion" pulse arriving at gate 826 into the second "start conversion" pulse. The pulser 828 serves to set flip-flop 824 so as to enable gate 826 when a second "start conversion" pulse is required.

RANGE GATES AND OUTPUT SWITCH POWER GATES

Power gates are required to allow the binary register to drive the FS switches 20–27 of FIGURE 2 and the digital to analog converters of FIGURE 13. Two-legged power gates 850–865 shown in FIGURE 12 are provided for controlling output selector switches 90–97 of FIGURE 2. One leg of each gate is driven by its associated binary register bit such as bits 870, 871 and 872 illustrated diagrammatically in FIGURE 12, corresponding to flip-flops FF–64, FF–128 and FF–256 of FIGURE 7. The other leg of each power gate is connected in common with all other gates and driven by the enabling control from line 820 which turns off the gates during a conversion process.

There is an output switch for each range listed in the description of the "Control Oscillators" hereinabove. Each of the switches 90–97 of FIGURE 2 is effectively a single-pole, double-throw switch with a third "off" position as indicated for switch 90 in FIGURE 2. Activation of one of two coils such as coils 900–907 indicated in FIGURE 12 produces one connection such as that shown in dash outline at 90b in FIGURE 2, and activation of the other of the coils such as 910–917 in FIGURE 12 produces the other connection corresponding to the connection shown in dash outline at 90a for switch 90.

Selection of the proper switch condition is effected by two signals, one from the binary register or from flip-flops 430 of the octave detector as indicated in FIG. 12 and a second from the range signals. The range signals are provided through a set of eight lines 920–927 with the line corresponding to the desired range activated.

Upon completion of a conversion, the reset signal from the power gate control flip-flop 807 in FIGURE 11 enables the power gates 850–865 whose outputs are used to activate the switches 90–97 of FIGURE 2.

In the ranges 1 through 3 in which no frequency doubling is used, the proper octave for a given frequency is indicated by a particular bit of the binary register. For example, a "one" in the 64-bit indicated at 870 in FIGURES 7 and 12 indicates that the upper octave must be selected, i.e. 65 to 129 megacycles per second, if the desired frequency is in range 1. In this cases there is a signal through range gate 931 of the series of range gates 930–945 shown in FIGURE 12. This signal activates power gate 851 associated with coil 910 of switch 90 to move the switch 90 to the lower positions indicated at 90a in FIGURE 2. If the 64-bit 870 had had a "zero," coil 900 would have been energized to place switch 90 in its upper position indicated at 90b.

Frequencies in ranges 4 through 8 are obtained by doubling lower frequencies, and selection of the correct octave for each range is made by odd-even control flip-flop 430 of the octave detector. In each range there are no more than two octaves, and for one of them "n" is odd. The information as to whether or not a frequency is in the odd or even octave is given by the one-bit of the octave detector register 420, but this register is repeatedly cycling at the command of the V.F.O. readout control, so that the odd-even flip-flop 430 is utilized to give this information. Thus, the odd-even control flip-flop 430 and the range information from lines 920–927 select the appropriate range gate of the series of gates 930–945, and the range gate signal biases its associated power gate of the series of power gates 850–865, thus activating the proper output switch relay coil of the series of coils 900–907 and 910–917.

Operation of the switch S–1 indicated at 77 in FIGURES 2 and 12 can be described after noticing its required position as a function of frequency in the following table:

| Frequency range, mc. | Switch position of S-1 | |
|---|---|---|
| | Connected to 129-257 mc. amp. | Connected to 257-512 mc. amp. |
| 512 to 514 | X | |
| 514 to 1,024 | | X |
| 1,024 to 1,028 | X | X |
| 1,028 to 2,048 | | X |
| 2,048 to 2,056 | X | X |
| 2,056 to 4,096 | | X |
| 4,096 to 4,112 | X | X |
| 4,112 to 8,192 | | X |
| 8,224 to maximum | | X |

To obtain a frequency of 512 to 514 megacycles per second or multiples of this range, the 256 bit of the binary register (FF-256 of the series of flip-flops shown in FIGURE 7) cannot be in the set state. To obtain 514 to 1024 megacycles per second or a multiple of this range of frequencies the 256 bit indicated at 872 in FIGURE 12 must be set. Therefore, the 256-bit indicated at 872 in FIGURE 12 is used to control the S-1 switch indicated at 77. This is accomplished by means of a power gate 950 which moves switch 77 to its lower position as seen in FIGURE 2 when the 256-bit 872 is set providing flip-flop 807 in FIGURE 11 is in reset condition as indicated at line 820 to signal the completion of a conversion signal as described in connection with the start control of FIGURE 11.

VARIABLE FREQUENCY OSCILLATOR

The method of providing a fine control for generator output frequency by using two variable frequency oscillators 50 and 51 shown in FIGURE 2 has been previously referred to. A common shaft such as indicated at 143 in FIGURES 1 and 15 which drives the 3-2 and 2-3 megacycle per second V.F.O.'s 50 and 51 also drives a digital shaft position encoder such as indicated at 160 in FIGURES 1 and 15 and a linear potentiometer such as indicated at 1008 in FIGURES 13c and 16. Details of the system are illustrated in FIGURE 16.

The digital position encoder 160 provides a digital output which varies between 0.00 and 0.99 as the 2-3 megacycle per second V.F.O 51 is tuned from 2.00 to 2.99 megacycles per second. For example, if it is assumed that the V.F.O control 140 is rotated in the clockwise direction from a central "off" position for increasing desired frequency, then shaft 143 might be driven by motor 142 in the clock-wise direction to tune V.F.O. 51 from 2.00 to 3.00 megacycles per second. When V.F.O. 51 is tuned to the top of its range, it is necessary to reverse the direction of rotation of shaft 143 if control 140 remains in a clockwise position. When shaft 143 is reversed in this way, the 3-2 megacycle per second V.F.O. output is selected by contact arm 52 from the position shown in FIGURE 16 to the position shown in FIGURE 2. The encoder output will now vary from 0.99 to 0.00 as V.F.O 50 in FIGURE 2 varies from 2.00 to 2.99 megacycles per second since shafts 143 and 163 are rotating in an opposite sense. However, the 9's complement of the encoder output is used in this case so that the proper correlation is again obtained.

The total V.F.O. configuration will therefore include the two V.F.O. sub-assemblies 50 and 51 shown in FIGURES 2 and 16 geared together for rotation in opposite directions and driven from a reversible motor indicated generally at 142 in FIGURE 1. The motor will also drive a two decade digital pickoff represented by the V.F.O. encoder 160 in FIGURE 1 and the linear potentiometer indicated at 1008 in FIGURE 13c. The digital pickoff is used to provide the fine frequency information to the digital sub-system and the potentiometer 1008 is used to provide information for the amplifier tuning.

The mechanical drive assembly including motor 142 also includes a limit switch 1649 to reverse the mode of operation of the unit. A mode relay 1600 is included which is operated automatically by the limit switch 1649 through the medium of a power flip-flop 1280. The mode relay will switch in the proper V.F.O. output, will establish the polarity of drive of shaft 143 for a given direction of turning of V.F.O. control 140 and will switch the sense of potentiometer 1008 by means of potentiometer relay 1682. Power flip-flop 1280 which is actuated under the control of limit switch 1649 and pulse amplifier 1271 controls the complemented readout from the V.F.O. encoder as indicated by line 1652 in FIGURE 16.

The equipment will also sense the time of transition by means of output 800 of pulse amplifier 1271 so as to initiate a re-computation cycle. One additional output will be provided to indicate the polarity demanded by any actuation of the vernier control knob 140. This by means of contact arm 1110 on shaft 1686 of control 140.

The internal coding of the shaft position encoder 160 will be non-ambiguous, reflected excess-three. This code is then converted to a straight binary-decimal, excess-three code for insertion into the V.F.O. register 170.

As was the case with the digital encoder 160, the linear potentiometer output will be complemented at the same time a different V.F.O. is selected by switch S-2. This function is readily accomplished by reversing the two input leads to the potentiometer by means of relay 1682 controlled from mode relay 1600.

As the V.F.O. is varied, in addition to the actual V.F.O. frequency, two other conditions of the V.F.O. must be known for proper computation and indication of the signal generator frequency:

(1) The direction of change, increasing or decreasing, and (2) The transition from one V.F.O. oscillator to the other.

The direction of change must be known so that the change in the V.F.O. as determined by the V.F.O. register change detector 197 may be properly added or subtracted from the binary decimal register 113. The direction indication is obtained from contact arm 1110 on control shaft 1686 and in accordance with this information, the appropriate input line 1104 or 1105 of the binary decimal counter shown in FIGURE 5 is selected.

The transition point must be known because this represents an increase or decrease of the generator frequency beyond the capacity of the V.F.O. and a new conversion sequence must be started. This conversion is initiated by the V.F.O. transition signal from pulse amplifier 1271 via line 800 to the start control of FIGURE 11.

V.F.O. CHANGE DETECTOR

When the effective V.F.O. is changed so as to increase or decrease the signal frequency by one megacycle per second, this change must be indicated to the binary-decimal counter of FIGURE 5. Because the actual V.F.O. frequency is multiplied by the V.F.O. register 170, the change must be detected at that register.

FIGURE 14 illustrates the V.F.O. register change detector. Any unit change in the frequency as a result of changing the V.F.O. will be indicated by a change in the 1 bit, flip-flop 531 of the V.F.O. register of FIGURE 9, in the units decade of the register. A change in this bit sets a flip-flop 1100 in FIGURE 14 so that a pulse can be supplied via gate 1102 to the binary-decimal register by means of line 1104 or 1105 to be added or subtracted, depending upon the position of the V.F.O. increase-decrease switch 1110.

The change pulse is introduced at line 1115 from the binary shift control of FIGURE 8. When the metering register 438 has counted out eight pulses and the required number of doubling pulses have been transmitted to the V.F.O. register, the reset signal of flip-flop 433 is supplied to the V.F.O. register change detector of FIG- URE 14 by means of line 1115. The signal is applied through gate 1120 because only changes resulting from V.F.O. variation are to be considered. A signal from flip-flop 807 of the start control of FIGURE 11 disables gate 1120 by means of line 820 to preventing indicating changes during a conversion.

When a clear signal is applied to the V.F.O. register, if a "zero" was in flip-flop 531, the 1 bit of the units decade of the V.F.O. register, there is no pulse through gate 1130, and the flip-flop 1100 remains reset. If now another "zero" is registered in the 1 bit flip-flop 531 as a result of "doubling" (no carry pulses to the units decade of the V.F.O. register), an input pulse to the change detector of FIGURE 14 is blocked at gate 1102 because flip-flop 1100 remains reset. Because flip-flop 531 is reset, gate 1140 blocks the signal from setting flip-flop 1100.

If, however, a "one" is registered (i.e. one carry pulse to the units decade), the set signal from flip-flop 531 in FIGURE 14 enables gate 1140 so that the input pulse sets flip-flop 1100 permitting the passage of the pulse through gate 1102 to the binary-decimal register of FIGURE 5. Flip-flop 1100 is reset as indicated at 5a in FIGURE 15a before the next clear signal (step 5b, FIGURE 15a) by means of line 1151. When the V.F.O. register of FIGURE 9 is cleared, the reset output of flip-flop 531 sets flip-flop 1100 through gate 1130 which is enabled by means of the V.F.O. register clear signal at line 1150 in FIGURE 4. If another "one" is put into flip-flop 531 after a doubling process, gate 1140 is enabled, and the input pulse resets flip-flop 1100 so that gate 1102 in FIGURE 14 is disabled.

With flip-flop 1100 initially set by a V.F.O. clear signal due to flip-flop 531 being set at the time of receipt of the V.F.O. clear signal, if there is a V.F.O. change, and a "zero" is put into the 1 bit flip-flop 531, gate 1140 is not enabled. Flip-flop 1100 remains set, and the input pulse goes through gate 1102 to change the binary-decimal counter.

Delay 1160 permits computation of the effective V.F.O. frequency so that flip-flop 531 is in its final state after doubling; delay 1170 allows time for the proper setting of flip-flop 1100.

DIGITAL TO ANALOG CONVERTERS

The digital to analog converters are similar to those illustrated in FIGURES 13a, 13b, 13c and 13d. Each converter comprises a series of two-legged gates such as 958–965 shown in FIGURE 13a. These gates are driven from the binary register bits corresponding to the numbers indicated within the blocks representing the gates. Thus, gate 960 is coupled to the set output of flip-flop FF-4 of the binary register of FIGURE 7. The gates are turned on by the enabling control via line 820 from flip-flop 807 of FIGURE 11 in the same manner as the gates 850–865 of FIGURE 12.

A tuning voltage is required for each R.F. amplifier shown in FIGURE 2. The range over which each of the component amplifiers in FIGURE 2 must be tuned is indicated within the blocks representing amplifiers 40–47 and adjacent the blocks representing the amplifiers 70–74. In the illustrated embodiment, the tuning voltage is to be accurate to the nearest 1/64 of this range.

With respect to amplifiers 40–47, the highest band amplifier must be tuned over a band from 257 to 512 megacycles per second. The tuning voltage is derived from the digital to analog converter shown in FIGURE 13a.

To determine how many and which bits from the binary register are required to drive the converter, consider the contents of the binary register when the frequency from amplifier 47 is 257 megacycles per second. Because the number in the binary register of FIGURE 7 is the desired frequency minus one in megacycles, the number in the binary register is 256. The 256 bit of the register (FF-256, not shown) is in set condition while all others remain reset. At mid-band of the amplifier, 385 megacycles per second, the number in the binary register is 384. For this latter number, the 256 bit is still set, but the 128 bit (FF-128) has become set also while all others remain reset. In the first half of the band of amplifier 47, a 128 bit was reset. As the second half was reached, this bit became set and will remain set throughout the second half. The 128 bit then determines in which half of the band of amplifier 47 the actual frequency lies. By extension of this reasoning, the combination of the 128 bit and the 64 bit of the binary register are required to determine in which one-quarter of the band the amplifier should be tuned. Because tuning to the nearest 1/64 of the band is required, all bits of the binary register from 128 through number 4 bit must be monitored.

The means of deriving an analog voltage controlled by these bits is shown in FIGURE 13a. The converters comprise power gates such as 960 having a series of rectifiers 1000 and resistors 1001 connected to the output thereof. Each gate supplies low impedance current to its converter leg comprising components 1000 and 1001, when its controlling binary bit in the binary register of FIGURE 7 is in set condition. The gate turns this current off when the bit is reset. When a bit is set, the amount of current in a given current leg is determined by a binary weighted resistor such as that indicated at 1001. As shown in FIGURE 13a, if the leg connected to the gate 965 is weighted 32, the weights of the other legs are determined in a binary progression. The output voltage, which is derived from the sum of the weighted currents across common resistor 1003, is the required tuning voltage.

The converter for the next lower order amplifier 46 is illustrated in FIGURE 13b. The controlling bits from the binary register of FIGURE 7 in this case will be FF-64 to FF-2 as indicated in blocks 959–964 in FIGURE 13b. The converter for amplifier 45 is controlled by binary register bits FF-32 through FF-1.

The converter for amplifier 44 cannot be controlled to the required accuracy by the binary register alone. In this range, the binary register can supply only part of the control, the remainder coming from the V.F.O. since its effect is no longer negligible in this range (33–65 megacycles per second) with respect to the desired accuracy for the illustrated embodiment. V.F.O. setting information for tuning purposes is derived from a potentiometer as indicated by line 1006 in FIGURE 1 and by block 1008 in FIGURE 13c. The potentiometer provides an output voltage which is an analog of V.F.O. frequency. The tuning for amplifier 44 is derived from the digital to analog converter of FIGURE 13c. As shown, the last five bits FF-16 through FF-1 of the binary register, as well as the V.F.O. potentiometer 1008, serve as inputs to this converter. The binary bits are weighted in a fashion identical to the previous converters. Since the leg driven by the gate 958 is weighted to number two, the V.F.O. leg whose net effect is one megacycle per second at full scale settings, is also weighted at two.

The converter for amplifier 43 is shown in FIGURE 13d and is similar to that in FIGURE 13c except that the leg controlled by gate 958 connected to the output of FF-1 in FIGURE 7 is weighted 4. By the same reasoning as above, the V.F.O. potentiometer leg for this converter also has a weight of 4. As previously, the V.F.O. potentiometer, designated by the reference numeral 1008, provides an output voltage which is an analog of the V.F.O. frequency. Thus, when the V.F.O. component 150 in FIGURE 1 is at the middle of its range, V.F.O. potentiometer 1008 will provide a voltage equal to one-half the maximum voltage, so that the weight of the potentiometer leg 1009 in FIGURE 13d will then effectively be two, or one-half that contributed by gate 958 when FF-1 of the binary register is set.

Converters for the three remaining amplifiers 40–42 in FIGURE 2 are derived in a similar manner. Only one power gate per binary bit of the binary register and only one V.F.O. potentiometer are used to supply all eight converters. All power gates are disabled by means of line 820 shown in FIGURE 11 during the period in which the binary register is undergoing any change.

The method of deriving tuning voltages for amplifiers 70–74 will now be described. The amplifiers 70–74 may comprise voltage controlled traveling wave tubes. The techniques of varying the resonant frequency of such traveling wave tubes by varying the potentials applied to several of its elements such as anode 1020, helix 1021 and collector 1022 is known in the art. Referring to FIGURE 2, note that the input frequency to the doubling chain of traveling wave tube amplifiers 70–74 is derived from either the 129–257 megacycle per second amplifier 46 or the 257–512 megacycle per second amplifier 47. The logic by which switch S–1 selects the proper amplifier has been described in connection with the discussion under the heading "Range Gates and Output Switch Power Gates." For the first doubling range, this switch selects the 129–257 megacycle per second amplifier 46 to yield an output frequency from 512 to 514 megacycles per second. In this range the frequency input to to the 257–512 megacycle per second amplifier 46 will be at the high end since amplifier 46 will be delivering a frequency of the order of 256 megacycles per second. Therefore, the output of the digital to analog converter for amplifier 47 shown in FIGURE 13a will be at the high end delivering a relatively high voltage from resistor 1003. At 514 megacycles per second, for the first traveling wave tube amplifier 70, however, the frequency input to the 257–512 megacycle per second amplifier 47 would be at 257 megacycles per second, which is at the low end of the tuning range of amplifier 47. To the nearest 1/64 of the range of the first traveling wave tube amplifier 70, the tuning voltage provided by resistor 1003 in FIGURE 13a for the 257–512 megacycle per second amplifier 47 can be used to tune the first traveling wave tube amplifier 70, provided that the output frequency is not in the 512–514 megacycle per second range.

The range over which this voltage from resistor 1003 in FIGURE 13a is not suitable for tuning the first traveling wave tube amplifier 70 is negligible compared to the required tuning accuracy. The tuning input to the traveling wave tube amplifier 70 can be held clamped to zero by another switch in parallel with switch S–1 (designated by reference numeral 77 in FIGURE 2) for this portion of the range. This clamping switch will not affect the tuning input to the 257–512 megacycle per second amplifier. Because all other traveling wave tube amplifiers are to be tuned to frequencies which are some even power of two times the first traveling wave tube frequency, the tuning voltage derived from resistor 1003 in FIGURE 13a can be used for all traveling wave tube amplifiers 70–74.

PROGRAMMER TIMING

Operation of the logical circuitry is controlled by a programmer 1190 indicated in FIGURE 15 whose output signals are synchronized to the pulses of a 100-kilocycle per second oscillator. The timing of the several steps required to obtain an indicated frequency from the signal generator is illustrated diagrammatically in FIGURE 15.

A conversion is started by a pulse from the coarse control switch 111 in FIGURE 11 or from the V.F.O. transition swtich which is actuated each time the V.F.O. shaft reaches a limit position and has to be reversed. The logic steps numbered 2, 3, and 4 in FIGURE 15 are repeated five times as indicated in order to convert a five-digit decimal number to a binary number. This conversion requires 500 microseconds. Steps 5 through 9 complete the logic process to obtain the frequency of the generator indicator 110. The total elapsed time is 2.6 milliseconds.

SUMMARY OF OPERATION

The operation of the illustrated embodiment may be outlined as follows:

(1) *Coarse Frequency Selection*

(a) SET DESIRED INTEGRAL FREQUENCY

The integral number corresponding to the desired frequency is first registered in the system by actuating knob 111, FIGURE 4, to cause the decade binary decimal counter of FIGURE 5 to count in the desired direction. The number counted into the counter of FIGURE 5 appears as an integral number at indicator 110, FIGURE 1.

(b) COARSE SWITCH OFF

As the number displayed at indicator 110 approaches the desired frequency, the rate of counting may be decreased by means of knob 111 in FIGURE 4, and finally when approximately the desired integral number appears at indicator 110, knob 111 is returned to "off" position. As indicated in FIGURE 11, return of knob 111 to "off" position causes switch 805 to close to transmit a pulse via line 866 to Pulser 828. This in turn sets flip-flop 824 and flip-flop 807.

(1) *Enabling control.*—When flip-flop 807 is set, the frequency selector power gates indicated at 191 in FIGURE 1, the output switch power gates indicated at 192 and the digital to analog converted power gates 958–964 in FIGURES 13a–d are disabled. Further, gate 1120 in FIGURE 14 is disabled to prevent delivery of pulses representing V.F.O. register changes to the binary decimal register or counter of FIGURE 5.

(2) *Start conversion.*—A setting of flip-flop 807 in FIGURE 11 also transmits a "start conversion" pulse via line 810 to the programmer 1190 of FIGURE 15.

(3) *Reset.*—The programmer now transmits a reset signal to the various components in preparation for the conversion cycle.

(2) *Transfer of Integral Number Corresponding to Desired Frequency From Binary Decimal Counter To Binary Register*

(a) FROM BINARY DECIMAL COUNTER TO BINARY REGISTER

As indicated in FIGURE 15, a pulse is transmitted by the programmer via line 256 to the converter counter 257 of FIGURE 6. The pulse causes the converter counter to register a "one" actuating gate 1303 to open transfer gates 1310–1312. The number in the binary decimal register or counter of FIGURE 5 in the ten thousand decade is then transferred to the binary register of FIGURE 7 via lines 292–295.

(b) SHIFT LEFT

As indicated in FIGURE 15, the programmer 1190 now sends three pulses via line 360 to the binary register of FIGURE 7 to cause the number in the register to be multiplied by eight.

(c) ADD (2x VALUE)

Following the three shift left pulses, a pulse is applied to line 354 in FIGURE 7 to add two times the value transferred into the binary register to the eight times product previously generated.

(d) ACCUMULATE

The above steps a, b, and c are repeated five times as indicated in FIGURE 15 to successively transfer each decade in the binary decimal counter to the binary register. The binary register now contains a number of straight binary code corresponding to the desired frequency.

(3) *Detect Octave Number, n*

The programmer 1190 in FIGURE 15 may now pulse line 400 in FIGURE 8 to cause registration of the octave number in octave detector register 420.

(4) *Double V.F.O. n Times*

By way of example, the programmer 1190 may now transmit a pulse to line 432 in the binary shift control of FIGURE 8 to set flip-flop 433 and open gate 435, whereby a number of pulses equal to the octave number, n, are delivered through gate 442 and line 500 to the V.F.O. register of FIGURE 9 to double the number of this register n times.

(5) *Subtract Integral Numbers in the V.F.O. Register From the Number in the Binary Register*

Programmer 1190 now sends a pulse to line 700 of the subtract pulser of FIGURE 10 to cause the integral number in the V.F.O. register to be subtracted from the binary register by means of line 370 in FIGURE 7.

(6) *Division of Number in the Binary Register by $2^n$*

(a) SHIFT RIGHT n TIMES

Line 445 is now pulsed to set flip-flop 431 and open gate 433 to transmit n pulses to the binary register 122 by means of line 360, control lines 351 and 353 of the binary register being energized.

(b) SUBTRACT FALLOUT

After each shift to the right of the binary register of FIGURE 7, any carry pulse representing a remainder is transmitted by means of line 380 to the fallout subtracter of FIGURE 8. With the first pulse transmitted to the binary register by line 360, the octave detector register 420 will be in a "one" condition to open gate 448 of the fallout subtracter so that one pulse is transmitted by line 447 to the minus count line 175 of the binary decimal counter of FIGURE 5. With the next pulse, the octave detector register 420 will read "two" to open gate 453, allowing two more pulses to be subtracted from the binary decimal counter. When the number n pulse is transmitted by gate 435, metering register 438 resets flip-flop 433 to close gate 435.

(7) *End Conversion*

An end conversion pulse may be transmitted by the programmer to line 812 of the start control of FIGURE 11. Since flip-flop 824 was set when coarse control 111 was moved to "off" position, the end conversion pulse will pass through gate 826 and start a second conversion cycle in case the subtraction of fallout carries may have reduced the number in the binary decimal counter to a value corresponding to a different octave number n. The first end conversion pulse resets flip-flop 824 to close gate 826 and open gate 822 in FIGURE 11, so that the second end conversion pulse will reset flip-flop 807 causing the switch power gates, digital to analog converters and V.F.O. change detector to be enabled.

(a) FREQUENCY SELECTOR GATES

The frequency selector (FS) switches 20–27 are controlled from the binary register of FIGURE 7. Switches 20–27 are controlled respectively, by the bits FF–1 to FF–128 of the binary register. Assuming a frequency between 33 and 512 megacycles per second is to be generated, the logic between any binary register bit and the associated frequency selector switch is as follows: if the value of the binary bit is zero, its associated FS switch is left in the position shown in FIGURE 2. If the bit value is one, the switch is operated. As shown in FIGURE 2, an FS switch in the normal position selects a given frequency; the same switch when operated selects twice that given frequency. As indicated in FIGURE 1, the binary register bits control frequency selector power gates 191. In one condition of a bit in the binary register, the power gate energizes a relay coil for the associated FS switch, while in the other condition of the binary register bit, the relay coil is de-energized and the FS switch is in the opposite position.

(b) OUTPUT SELECTOR SWITCHES

The output switches 90–97 are in a neutral position unless one of the associated relay coils 900–907 or 910–917 is energized as indicated in FIGURE 12.

(c) DIGITAL TO ANALOG CONVERTERS

The binary register of FIGURE 7 controls power gates 958–965 of the digital to analog converters of FIGURES 13a–d to generate tuning voltages for amplifiers 40–47 and 70–74. FIGURE 13a indicates the digital to analog converter number 1 for controlling tuning of amplifiers 47 and 70–74.

For tuning at low frequencies, the setting of the V.F.O. 150 in FIGURE 1 is taken into account by means of the V.F.O. potentiometer indicated at 1008 in FIGURES 13c and 13d.

(8) *V.F.O. Change Detection*

With flip-flop 807 of FIGURE 11 reset, gate 1120 in FIGURE 14 is enabled by line 820. Flip-flop 531 of the V.F.O. register of FIGURE 9 is connected into the change detector of FIGURE 14 in such a manner that if the number in the V.F.O. register increases or decreases by one, this is added or subtracted from the binary decimal register of FIGURE 5 by means of line 1104 or 1105. The V.F.O. increase-decrease switch 1110 of FIGURE 14 may be controlled, for example, as shown in FIGURES 16 and 17.

MODIFIED V.F.O. ARRANGEMENT

FIGURES 16 and 17 illustrate the details of the V.F.O. drive system and corresponding parts in the two figures have been given the same reference numerals so that one description (with respect to FIGURE 17) should suffice for both figures.

In the illustrated drive arrangement, a 400 cycle per second signal source indicated at 1730 energizes primary 1732a of a transformer 1732 to energize a center-tapped secondary winding 1732b. A potentiometer 1735 is connected across the secondary winding 1732b, and has a contact arm 1737 rotatable with shaft 1686 in such a manner that clockwise rotation of knob 140 causes contact arm 1737 to move in the direction of the arrow 1740 to vary the point of contact of arm 1737 with the resistance element 1735a. Arm 1737 and center 1742 are connected to the reversible two phase motor 142 by means of lines 1750 and 1751 under the control of contacts 1760a and 1760b of mode relay 1760. By actuation of mode relay 1760, the connection between line 1750 and 1751, and lines 1770 and 1771 leading to the motor 142 are reversed. In the position of arm 1737 shown, the phase relation between the voltages of lines 1770—1771 and 1780—1781 may be such as to cause motor 142 to rotate shaft 143 in the direction of arrow 1784, arm 1008a of potentiometer 108 moving in the direction of arrow 1785, and worm wheel 1787 being driven from gear 1789 in the direction of arrow 1790. If arm 1737 is left in the position shown, pin 1201 on worm wheel 1787 will eventually move into engagement with fixed stop 1202 to stop rotation of shaft 143 at the lower (2.00 megacycles per second)) end of the tuning range of V.F.O. 51. Slip clutch 1793 allows motor 142 to continue rotation at this point. Cam C–2 on worm wheel 1787 at this time has actuated limit switch 1649 by means of actuating button 1650 to send a pulse from voltage source 1800 to pulse amplifier 1271 to start a conversion cycle.

Prior to the start of the conversion cycle, the fact that V.F.O. 51 has reached the low end of its tuning range (2.00 megacycles per second) has been read into the V.F.O. register 170, and the sequence of FIGURE 15a has been followed to subtract a unit of frequency from the binary-decimal counter 113. Since arm 1110 is in sliding engagement with arcuate contact 1110a of the increase-decrease switch, the count in the binary decimal register will be reduced by one.

To take a simplified numerical example, suppose that the original number in the binary register of FIGURE 7 were 18. Flip-flop FF–2 and FF–16 of FIGURE 7 would then be in set condition, and power gates 1821 and 1824 would be actuated to energize the corresponding relay coils 1831 and 1834 of switches FF–4 and FF–32. With V.F.O. 51 providing 2.00 megacycles per second, mixer 30 would then provide an output frequency at three megacycles per second, mixer 31 would provide an output of 7 megacycles per second, mixer 32 would provide an output of 11 megacycles per second, and mixer 33 would provide an output of 19.00 megacycles per second.

If, however, arm 1737 was retained at the "down" side of midpoint 1775 of potentiometer 1735, a conversion cycle would be initiated wherein the number 17 would be registered in the binary register to actuate flip-flop FF–16 and FF–1. Power gates 1820 and 1824 would now be energized pulling down switch arm 20 together with switch arm 20' linked thereto as indicated at 1860. This would energize mode relay 1760 and cause motor 142 to begin rotating the V.F.O. shaft 143 in the opposite direction from that indicated by arrow 1784 to tune the V.F.O. from 2.00 megacycles per second toward 3.00 megacycles per second. At 2.00 megacycles per second, for the V.F.O. 51, the 7 megacycle per second output from mixers 1703 and 1704 would produce a 5.00 megacycle per second output from mixer 30. This would produce an output of 7.00 megacycles per second from mixer 31, 11.00 megacycles per second from mixer 32 and 19.00 megacycles per second from mixer 33.

If arm 1737 still remains on the down side of center point 1775, V.F.O. 51 will tune in the direction of increasing frequency. Thus at 2.01 megacycles per second output from the V.F.O., mixer 30 will deliver an output of 4.99 megacycles per second and the output from amplifier 43 will be 18.99 megacycles per second.

If arm 1737 still remains on the down side, V.F.O. will be tuned to 3.00 megacycles per second after which stop pin 1200 will engage limit stop 1202 and cam C–1 will actuate limit switch button 1650 to initiate a conversion cycle. This conversion cycle will signal deenergization of relay coil 1830 of switch FF–2 to deenergize mode relay 1760 and thus to cause motor 162 to rotate shaft 143 in the direction of arrow 1784 which is the direction of decreasing frequency output from the V.F.O. 51.

Thus the same end result may be obtained from FIGURE 17 as is obtained from FIGURE 16 using two V.F.O.'s.

It will be apparent that many modifications and variations may be effected without departing from the scope of the novel concepts of the present invention.

EXAMPLES OF SUITABLE CIRCUITS FOR DISCLOSED EMBODIMENT

While the implementation of the disclosed system will be fully apparent to those skilled in the art from the foregoing description, certain exemplary circuits will be described where this may be of convenience to those desiring to practice the illustrated embodiment. The remaining circuits involve such routine choices from known and commercially available sources that a discussion thereof herein would not be of interest to those skilled in the art. There is no intention to limit the invention to the circuits discussed herein, since many alternative arrangements are available and will readily occur to those skilled in the art. While certain circuits and components are considered in the following discussion and defects thereof pointed out, this is with respect to a particular application and desired operating characteristics, and is not intended as a limitation on the range of possible implementations of the concepts of the present invention.

(a) VARIABLE FREQUENCY OSCILLATOR (V.F.O.)

In any continuously variable heterodyne frequency generator, the generator stability and calibration can be essentially that of the variable frequency oscillator, provided the fixed oscillator or oscillators with which the variable frequency is heterodyned can be made with an error negligibly small. Crystal oscillators which exhibit an aggregate error in the order of a fraction of a part per million are well within the state of the art and satisfy this condition.

The Hartley, Colpitts, Clapp and phase shift oscillators are all capable of good stability and waveform. Obtaining a linear tuning rate presents severe problems, if conventional variable capacitor tuning is employed, since it is extremely difficult to manufacture a variable capacitor which approaches linearity. It is also very difficult to correct errors in linearity during rotation when using variable capacitors. It is possible to tune a variable frequency oscillator by varying the position of a ferromagnetic core within the frequency-determining inductor. If the core is mounted on a lead screw, it can be inserted into and withdrawn from the inductor by several turns of a tuning shaft, thus providing any desired tuning position. It is then necessary to wind the inductor in such a manner as to provide a constant increment in oscillator frequency for each turn of the tuning shaft. A fair degree of linearity can be obtained in this manner. Excellent linearity can then be had by employing a cam operated corrector mechanism to provide correction for errors in the inductor winding pitch.

Oscillator stability with regard to changes in environmental conditions can be maximized by careful temperature compensation of the frequency determining circuit, proper sealing against the effects of high humidity, and construction techniques that reduce the effects of shock and vibration.

Changes in frequency as a result of power supply voltages may be reduced through the use of plate supply voltage regulation and filament supply current regulation.

A variable frequency oscillator whose performance is well within the required tolerances is commercially available. The oscillator operates in the range 2 to 3 mc. It is permeability tuned through this range by ten turns of its tuning shaft. The oscillator maintains a calibration linearity of 750 cycles throughout its range. The maximum frequency drift is 400 cycles over a temperature range of 40° F. to 120° F. Using plate voltage regulation and filament current regulation, the short term (24 hours or less) stability will be in the order of 0.003%. The ability of the oscillator to reset to the same frequency at a given angular position from the same direction of tuning shaft rotation is in the order of 5 parts per million. Backlash error is limited to 50 parts per million or less. These peak errors combine on an R.M.S. basis to a combined error of 870 cycles and even on a linear combination basis combine to only 1405 cycles. If a probable error is taken as one-half of the individual peak error, then the R.M.S. combination of probable error would be about 435 cycles.

Since in most applications the stability and fineness of adjustment of R.F. output is of slightly greater significance than resolution of the digital output representing this frequency, the quantizing level chosen for the V.F.O. shaft may be 10 kc., which means that the greatest quantizing error from the shaft position pickoff used for indication is one-half the quantizing level, or about 5 kc. A smaller quantizing level could be incorporated should the application warrant it.

A suitable commercially available variable frequency oscillator utilizes two type 5749 pentodes in the oscillator circuit. Feedback is applied to a tap on the oscillator tank coil from the screen grid of the second or buffer tube. The circuit is operated with both cathodes at ground potential, thereby eliminating frequency modulation due to hum pickup from the filaments.

(b) 1 MC. OSCILLATOR

The basic concept for the fixed frequency source is to utilize the frequency doubling technique from a single precision crystal controlled oscillator. This approach has many desirable characteristics in the system's accuracy and stability. A "GT" cut crystal may be utilized. A typical manufacturer of crystals states the stability and accuracy of a "GT" cut crystal to be 15 cycles over a temperature range of from 0° C. to 50° C. and ±.0005% or 5 parts per million frequency tolerance. To improve the stability figure, the crystal may be oven controlled. The small frequency drift which then would occur would only be a small fractional part of one part in a million. The frequency tolerance of ±.0005% would be reduced to approximately ±.0001% or better by the use of a frequency adjustment. Crystal oscillators which employ "GT" cut crystals include the Meacham-Bridge, two-stage-grounded cathode, transitron, transformer-coupled, Butler, and modified Colpitts. The Meacham-Bridge has several definite advantages compared to some of the above oscillators. The crystal to be used in the Meacham-Bridge is almost completely decoupled from the active circuit, allowing the crystal to operate at a much higher "Q." Since the Meacham-Bridge contains an A.C. balancing bridge, a high degree of stability can be achieved. Terman's "Radio Engineers' Handbook," First Edition, 1943, shows a typical Meacham-Bridge oscillator at page 496, FIGURE 15(e).

(c) DOUBLERS

The basic concept of generating a group of extremely stable frequency sources by the use of frequency doubling will now be discussed. There are several basic methods for implementing frequency doubling or more generally, frequency multiplying, which would be applicable to this particular requirement. The single tube multiplier, push-pull multiplier, and the push-push multiplier are all standard examples of frequency multiplication circuitry.

The single tube multiplier is nothing more than an amplifier whose control grid is driven with a given frequency and whose plate circuit is resonant to some multiple or harmonic of the driven frequency. Thus, when the frequency at the grid is 3.5 mc., output at 3.5 mc., 7 mc., 10.5 mc., 14 mc., etc. may be obtained by varying the resonant frequency of the plate circuit. Note that the undesired odd order harmonics appear together with the even terms. Efficiency in a single-tube multiplier depends upon the order of harmonic or multiple of the original signal. In general, the higher the harmonic desired, the less efficient the circuit becomes.

The push-pull multiplier has in general the same circuit parameters and characteristics as the single-tube multiplier. However, since the tubes are functioning in push-pull the cancelling of even harmonics or multiples in the plate resonant circuit occurs. This circuit would not be a wise choice for use in the illustrated embodiment involving frequency doubling.

It can be seen that the above two multipliers have undesirable characteristics which seriously hamper the practicality. Therefore, the "push-push" multiplier was chosen. The "push-push" multiplier, a two-tube circuit which operates satisfactorily at even harmonics or multiples, but not at the fundamental or odd multiples, is shown in FIGURE 18. The control grids are connected in parallel. The efficiency of a doubler using this circuit may approach that of a straight amplifier under similar operating parameters, because there is a plate-current pulse for each cycle of the output frequency. The selection of the pi network instead of the conventional parallel resonant network had the desirable characteristics of suppressing the 4th harmonic by approximately 50 db as compared to only 37 db in a conventional parallel network. The problem of coupling one doubler stage to another, utilizing the "push-push" doubler technique, is comparatively simple. The use of the pi network enables coupling of an unbalanced line to a self-balancing coupling transformer, in which the transformer is connected in "push-pull" on the control grids. This type of frequency doubling up to and including 256 mc. is well within the present state of the art.

(d) LOW FREQUENCY MIXERS

In order to arrive at various frequencies throughout the ranges of the disclosed embodiment, it is necessary that pairs of signals at different frequencies be heterodyned together, and the sum frequency be selected and passed to an amplifier stage or stages.

Among the suitable methods of frequency conversion is the dual control pentode mixer. This method may be selected for use in the illustrated embodiment.

Referring to the schematic diagram of a typical mixer stage, FIGURE 19, it can be seen that the signal from the one mc. crystal oscillator (or one of its harmonics) is applied to the No. 1 grid of a type 5636 pentode tube. A signal from the variable frequency oscillator (or another mixer-amplifier) stages is injected into the No. 3 grid of the same tube. The plate load of the tube is a current-tuned ferromagnetic inductor, tunable through the frequency range by information from the logic and programming system. Output from the mixer stage is capacity coupled to an octave range tunable amplifier and the tuned circuit therefore is also effectively at the input of the octave amplifier.

Mixer stages in the embodiments illustrated must operate at frequencies from 3 mc. through 512 mc. In the interest of uniformity, it is desirable to employ the dual control pentode mixer throughout the range. It may, however, be necessary to utilize a triode mixer at the upper limit of the frequency range.

As in all mixers, the output of this mixer stage contains the two injected frequencies, plus the sum and difference frequencies of the injected signals. Use of these mixers in their linear range inhibits the generation of harmonic terms.

(e) TUNABLE AMPLIFIERS (1) *3–257 range.*—The amplitude of the R.F. output of a preferred embodiment should be of sufficient magnitude to be usable for a variety of applications. The amplification of the signal should be accomplished immediately following the frequency mixing circuitry. The output from this amplifier should be single frequency with no spurious frequencies existing throughout its complete frequency range. The frequency range of any one of the amplifiers is illustrated as covering approximately a 2 to 1 spectrum. The gain should be approximately 20 db or more over the frequency range of 3 to 257 mc.

Relying on a completely mechanically programmed tunable amplifier to cover an octave would involve bulk and complexity, and make difficult the unitized packaging desired in the illustrated embodiment. This problem is resolved by the Octave Range Tunable Amplifier (ORTA) which is completely current tuned. Ferromagnetic inductors as tuning elements are currently being applied to such requirements. Complete frequency coverage up to 257 mc. can be accomplished through the use of ferromagnetic inductors with the necessary 2 to 1 frequency coverage. A simplified schematic is shown in FIGURE 19 of a suitable "ORTA" and mixer. As a result of advancing arts in ferrites, "Q's" of 30 to 50 or more are obtainable in such a device. Basing design parameters on this information voltage gains of 20 db to 30 db can be achieved, which satisfies the basic requirement. The tuning currents are derived directly from the binary logic circuitry. The spurious signal can be attenuated considerably, and a generation of an essentially single frequency output can be achieved.

(2) *Tunable amplifier for the 257–512 mc. range.*—The frequency range 257–512 mc. will require a different type of tunable amplifier other than the "ORTA." The reason being that ferromagnetic inductors are impractical to use above 350 mc. at present. The amplifier preferred for use in this frequency range is mechanically tuned. The programmed tuning again is derived from the binary logic circuitry. The tuning information is indexed in 32 channels. Such an amplifier might consist of either one or two subminiature pentodes and one subminiature triode. The pentodes are R.F. amplifiers and the triode is a cathode follower. The suggested selection of U.H.F. pentodes as R.F. amplifiers instead of U.H.F. triodes results from the problem of neutralizing the triodes over a frequency range of 2 to 1. The tuning element of the R.F. circuit, in order to cover a 2 to 1 frequency range, must have ganged variable reactance in both the inductive and capacitive branch of the circuit. There are a variety of such tuning elements; the butterfly, adjustable transmission line, and the variable inductor.

(3) *512–12,000 mc. range*.—The amplifiers for the frequency range from 512 mc. to 12,000 mc. may be traveling wave tubes, designed to operate in their dispersive region.

The application of the T.W.T to operate as a tunable narrow band amplifier is well within the state of the art. T.W.T.'s have been designed and developed to operate in the dispersive region of the T.W.T. characteristics, where the velocity of the waves varies as a function of frequency. In this region operation at a finite voltage condition leads to amplification over only a relatively narrow band of frequencies. Moderate levels of gain, in the order of 25 db to 35 db have been obtained in actual practice. The fact that it can be used as a tunable band-pass amplifier, the center frequency of which is variable merely by varying the helix potential lends it particularly to this application. It is possible to vary the center frequency of such amplifiers over a frequency range of 2 to 1.

The dispersive T.W.T., in order to maintain essentially constant gain, must have a tracking potential on the anode element.

The digital programmer, which controls a regulated voltage controlled power oscillator, develops 84 channels of information that programs the voltages applied to the anode, helix, and collector elements of the T.W.T. This varying voltage becomes the tunable element to permit narrow band amplification. The narrow-band operation of the dispersive amplifier can result in a relatively flat gain characteristic in the pass band, very steep skirts on the sides of the pass bands, and considerable off-channel rejection. This characteristic is particularly desirable for its intended use in the precision frequency generator.

(*f*) DIODE HARMONIC GENERATORS

In the generation of signals in the range 512 mc. to 12 kmc., the illustrated frequency generator employs frequency multiplier stages.

The ability of the crystal diode to produce harmonics can be used to good advantage since the output of such a stage is rich in the harmonics of a single exciting frequency. Since the signals present would be separated in frequency by the frequency of the input signal, it is feasible to select the desired harmonic (in the present instance, the second harmonic) and reject the exciting frequency plus the undesired harmonics. In the illustrated frequency generator this will be accomplished by coupling the output from the diode harmonic generators to the input of a traveling wave tube operating in the dispersive region. FIGURE 20 shows a typical diode harmonic generator.

(*g*) TRAVELING WAVE TUBE POWER SUPPLIES

The traveling wave tube amplifiers used in the range 512 mc. to 12,000 mc. require individual power supplies since the various element potentials vary from tube type to tube type. It is also necessary that certain elements of the traveling wave tubes be supplied with voltages that can be varied. These variable voltages are used in tuning a given tube through its frequency range.

The currents required by the traveling wave tubes are very small, and it is economical of power and space to employ R.F. driven power supplies.

FIGURE 21 shows a typical traveling wave tube power supply. A triode connected type 5763 vacuum tube provides the R.F. drive for the power supply. It is arranged as a grounded anode Hartley oscillator, operating at a low radio frequency. Output is taken from the series-resonant circuit in its plate circuit. A loosely coupled winding on the inductor portion of the tuned circuit provides filament power for the IX2B rectifier tube. After rectification, the output voltage is suitably filtered and distributed by means of a voltage divider.

Magnitude control and regulation of the power supply output voltage is accomplished by varying and regulating the D.C. plate voltage applied to the R.F. oscillator. Regulation is accomplished through the use of a conventional series regulator tube. The control information is isolated by a cathode follower and used as a reference for the regulator.

Filament power for the traveling wave tubes will be obtained from individual filament transformer windings.

(*h*) FS SWITCHES

To accomplish a resolution of 1 mc. from the fixed frequency sources distributed in the natural binary numbering system, the use of switches is mandatory. The "FS" switches may be commercially available single-pole, double-throw coaxial switches. In the energized position, the "FS" switches are electrically connected to their respective fixed frequency sources. For example, the "FS–16" switch in its energized position is connected to the 16 mc. fixed frequency source. In the deenergized position, the "FS" switches are electrically connected to the next lower fixed frequency source. For example, the "FS–16" switch in its de-energized position is connected to the 8 mc. fixed frequency source. The common arms of the "FS" switches may always be connected to their respective mixers. The energized and neutral positions of the "FS" switches may be determined entirely from the system logic.

If desired, any of the amplifiers may be tuned manually and such a modification is specifically contemplated as part of the present disclosure. Further, low frequency ranges such as 33 kilocycles per second to 12 megacycles per second may be generated by the system and are specifically disclosed hereby.

We claim as our invention:

1. In combination, a series of frequency sources providing successive different output frequencies, a series of frequency adders each having first and second inputs and an output, means for connecting each frequency source to the first input of a respective one of said adders, means for connecting the output of each adder to the second input of the next succeeding adder, a series of frequency multipliers connected in tandem to the output of the last of said series of frequency adders for successively multiplying the output frequency of said series of adders, and switch means connected to the output of a plurality of said frequency multipliers for selectively providing an output from any one of said plurality of frequency multipliers.

2. In combination, a series of frequency sources providing successively different output frequencies, a series of frequency adders each having first and second inputs and an output, means for selectively connecting each frequency source to the first input of a respective one of said adders, frequency doubling means, and means for selectively connecting the outputs of two of said adders to the input of said doubling means.

3. In combination, a series of frequency sources providing successively different output frequencies, a series of frequency adders each having first and second inputs and an output, means for selectively connecting each frequency source to the first input of a respective one of said frequency adders and to the first input of another of said frequency adders next succeeding said one frequency adder in said series of adders, frequency multiplying means, and means for selectively connecting the output of each of two adders to the input of said frequency multiplying means.

4. In combination, a series of frequency sources providing successively different output frequencies, a series of frequency mixers each having first and second inputs and an output, means for selectively connecting each frequency source to the first input of a respective one of said mixers and to the first input of another of said mixers next succeeding said one of said mixers in said series of mixers, means for connecting the output of each mixer to the second input of the next succeeding mixer in said series of mixers, frequency multiplying means, means for connecting the output of one of said mixers to the input of said frequency multiplying means, output means for receiving an output frequency, and selector switch means for selectively connecting said output means with the output of at least one of said mixers, and with the output of said frequency multiplying means.

5. In combination, a series of frequency sources providing successively different output frequencies, a series of frequency adders each having first and second inputs and an output, means for connecting each frequency source to the first input of one of said adders, means for connecting the output of each adder to the second input of the next succeeding adder in said series of adders, a series of tunable amplifiers each connected to the output of one of said adders and covering a frequency range including the sum of the output frequency of the frequency source connected to the first input of said one of said adders and the ouput frequencies of all frequency sources preceding said frequency source connected to said one of said adders, and means for selectively multiplying the output frequency of the last of said series of tunable amplifiers by any of a plurality of different factors.

6. In combination, a series of frequency sources providing successively different output frequencies, a series of frequency adders each having first and second inputs an an output, means for selectively connecting each frequency source to the first input of a respective one of said frequency adders and to the first input of another of said frequency adders next succeeding said one of said adders in said series of adders, means for connecting the output of each adder to the second input of the next succeeding adder in said series of adders, frequency multiplying means, means for connecting the output of the last of said series of adders to the input of said frequency multiplying means, output means for delivering an output frequency, and selector switch means for selectively connecting said output means with the output of each of said adders, and with the output of said frequency multiplying means.

7. In combination, a series of frequency sources each providing an output frequency twice the output frequency of the preceding frequency source, a series of frequency adders each having first and second inputs and an output, means for selectively connecting each frequency source to the first input of one of said frequency adders and to the first input of another of said frequency adders next succeeding said one of said frequency adders in said series of adders, means for selectively doubling the output frequency of the last of said series of adders and the next to the last of said series of adders.

8. In combination, a series of frequency sources providing successively different output frequencies, a series of frequency mixers each having first and second inputs and an output, means for selectively connecting each frequency source to the first input of a respective one of said frequency mixers and to the first input of another of said frequency mixers next succeeding said one of said frequency mixers in said series of frequency mixers, means for connecting the output of each frequency mixer to the second input of the next succeeding frequency mixer in said series of frequency mixers, frequency multiplying means, means for signalling a desired output frequency, and means coupled to said signalling means and to said interconnecting means for automatically interconnecting said frequency sources, mixers and multiplying means to provide the desired frequency.

9. In combination, a series of frequency sources each providing an output frequency twice the output frequency of the preceding frequency source of said series, a series of frequency adders each having first and second inputs and an output, means for selectively connecting each frequency source to the first input of one of said frequency adders and to the first input of another of said frequency adders next succeeding said one of said frequency adders in said series of adders, means for connecting the output of each adder to the second input of the next succeeding adder in said series of adders, frequency multiplying means, means for signalling a desired frequency output, and means responsive to said signalling means for automatically interconnecting said frequency sources and said adders and said multiplying means to provide the desired frequency output.

10. In combination, means for generating a series of output frequencies in a predetermined range, counting means operative to register successive numbers corresponding to said series of output frequencies in said predetermined range, means controlling said counting means to cause the counting means to successively count through said successive integral numbers corresponding to integral units of output frequency, means coupled to said counting means and responsive to the number registered therein to cause said generating means to produce the corresponding output frequency, and vernier control means for generating fractional numbers corresponding to subunits of output frequency and operatively connected with said counting means to control the integral member count therein.

11. In combination, means for generating a series of output frequencies in a predetermined range, counting means operative to register successive numbers corresponding to said series of output frequencies in predetermined ranges, means controlling said counting means to cause the counting means to successively count through said successive numbers corresponding to said series of output frequencies, means coupled to said counting means and responsive to the number registered therein to cause said generating means to produce the corresponding output frequency, said controlling means having means for automatically adjusting the rate of counting of said counting means through said successive numbers in successive ranges of desired output frequencies.

12. In combination, means for generating a succession of output frequencies in a predetermined range comprising a series of sources of fixed frequencies, a series of frequency mixers and multipliers, said frequency mixers each having first and second inputs and an output, means for selectively connecting each frequency source to the first input of a respective one of said frequency mixers and to the first input of another of said frequency mixers next succeeding said one of said frequency mixers in said series of frequency mixers, means for connecting the output of each frequency mixer to the second input of the next succeeding frequency mixer in said series of frequency mixers, electrical counting means for generating numbers corresponding to said successive output frequencies, means coupled to said counting means and to said generating means for controlling said generating means to produce an output frequency in accordance with the number registered by said counting means, means for controlling counting of said counting means through said successive numbers, and means for actuating said controlling means to initiate counting of said counting means, said sources of fixed frequencies providing a series of frequencies each twice the preceding frequency in said series, and said counting means being operative to generate said numbers in binary form.

13. In combination, means for generating a series of output frequencies in a predetermined range including frequency multiplying means for multiplying an input frequency by a factor K, counting means operative to register successive numbers corresponding to said series of output frequencies in said predetermined range, means controlling said counting means to cause the counting means to successively count through said successive integral numbers corresponding to integral units of output frequency, means coupled to said counting means and responsive to the number registered therein to cause said generating means to produce the corresponding output frequency, and vernier control means for generating fractional numbers corresponding to sub-units of output frequency, means for multiplying the numbers generated by said vernier control means by the factor K, and means for subtracting any integral units of frequency in the product from the number in said counting means.

14. In combination, frequency generator means having an output for delivering a plurality of different frequencies and comprising a series of switches which must be set in respective different combinations of positions depending on the desired output frequency, an electrical register for registering numbers and operatively connected to said switches to actuate the same in accordance with the number registered therein, means coupled to said register for introducing a number therein related to the desired output frequency to correspondingly set said switches, frequency multiplying means connected to the output of said frequency generator means to multiply the output frequency of said frequency generator means by a factor K, and means for electrically dividing the number registered in said electrical register by the factor K when the number introduced by said number introducing means to said register corresponds to a desired output frequency exceeding the greatest output frequency available from the frequency generator means alone.

15. In combination, a series of frequency sources providing successively different output frequencies, a series of frequency mixers each having first and second inputs and an output, means for connecting each frequency source to the first input of one of said mixers, means for connecting the output of each mixer to the second input of the next succeeding mixer in said series of mixers, switch means for selectively controlling the interconnection of the respective frequency sources and first inputs of said mixers, a series of tunable amplifiers each connected between the output of one of said mixers and the second input of the next succeeding mixer in said series of mixers, means for generating a number in electrical form corresponding to a desired frequency to be generated by said series of frequency sources, frequency mixers and amplifier means, and means controlled by the number in said generating means for actuating said switch means and tuning said amplifier means in accordance with the number in said generating means to produce the frequency corresponding to said number by combination of said frequency sources and mixers.

16. In combination, means for generating a succession of output frequencies in a given range comprising a frequency source, a series of frequency doubler circuits connected in tandem and providing successive output frequencies, a series of frequency adders each having first and second inputs and an output, switch means for selectively connecting the output frequency of each of said frequency doublers to the first input of one of said frequency adders and to the first input of another of said frequency adders next succeeding said one of said frequency adders in said series of adders, means for connecting the output of each adder to the second input of the next succeeding adder in said series of adders, counting means for generating numbers in electrical form corresponding to possible output frequencies from said generating means, and means coupled to said counting means and to said switch means and controlled by the number generated by said counting means for actuating said switch means to produce the desired frequency corresponding to the number registered by said counting means.

17. In combination, means for generating a succession of output frequencies in a given range comprising a series of sources of fixed frequencies, a series of mixers each having first and second inputs and an output, switch means for connecting each frequency source to the first input of one of said mixers, means for connecting the output of each of said mixers to the second input of the next succeeding mixer in said series of mixers, counting means for generating numbers in electrical form corresponding to output frequencies in said given range, means for causing said counting means to count up and down selectively to a desired number corresponding to a desired frequency in said given range, means coupled to said counting means and to said switch means and controlled by the number in said counting means for automatically actuating said switch means to produce the desired frequency corresponding to the number registered by said counting means, said counting means having means associated therewith for providing a visible indication of the number registered in said counting means, fractional control means for supplying fractional increments of frequency to the second input of the first of said series of frequency mixers, and means interconnecting said control means with said counting means to change the number in said couting means each time said fractional control means is moved through a range corresponding to an integral unit of output frequency.

18. In combination, means for generating a succession of output frequencies in a given range comprising a series of sources fixed frequencies, a series of frequency mixers having first and second inputs and an output, switch means for connecting each of said series of sources of fixed frequencies to the first input of one of said series of mixers, means for connecting the output of each of said series of mixers to the second input of the next succeeding mixer in said series, the first of said mixers having a variable frequency oscillator connected to the second input thereof tunable between $a$ and $b$ frequency units, switch means for alternately connecting each of two input terminals with the first input of said first mixer of said series, the first of said series of frequency sources being connected to one of the input terminals of the switch means and having an output frequency of $c$ frequency units, and a frequency source of $d$ frequency units connected to the other of the input terminals of said switch means, said last mentioned switch means being actuatable at the limits of tuning of the variable frequency oscillator to provide a continuously increasing output frequency as the variable frequency oscillator is tuned from $a$ to $b$ and then from $b$ to $a$.

19. In combination, means for generating a succession of output frequencies in a given range comprising a series of sources of fixed frequencies, a series of mixers having first and second inputs and an output, switch means for connecting each of said frequency sources with a first input of said mixers, means for connecting the output of each mixer with the second input of the next succeeding mixer in said series, counting means for generating numbers in electrical form corresponding to output frequencies in said given range, means coupled to said counting means and to said switch means and controlled by the number in said counting means for actuating said switch means to produce the desired frequency corresponding to the number registered by said counting means, fractional control means for superimposing a variable frequency on the output of said generating means corresponding to a fraction of the counting units of said counting means, and means interconnecting said control means with said counting means to change the number in said counting means each time said fractional control means is moved through a range corresponding to an integral unit of output frequency of the output frequency generating means.

20. In combination, a series of frequency sources providing successively different output frequencies, a series of frequency mixers each having first and second inputs and an output, means for connecting one of said series of frequency sources with a first input of one of said series of frequency mixers, means for connecting the output of each frequency mixer of said series to the second input of the next succeeding frequency mixer of said series, frequency multiplying means having an input connected to the output of the last of said series of frequency mixers for receiving an output frequency from said mixers and having a plurality of outputs for delivering frequencies $K_1$ and $K_2$ times the output frequency of said last of said series of mixers, register means for registering a number, means for introducing a number into the register means corresponding to the desired output frequency, electrical means for determining the required multiplying factor to provide the desired output frequency, means for dividing the number in the register means by the required multiplying factor, and means coupled to said register means and controlled by the number in said register means and controlling the interconnection of said frequency sources and frequency mixers to provide an output frequency at the output of the last of said series of frequency mixers in accordance with the quotient in said register means.

21. In combination, a series of frequency sources each providing an output frequency twice the output frequency of the preceding frequency source of said series, a series of frequency mixers each having first and second inputs and an output, means for selectively connecting certain of said frequency mixers with the first input of each of said series of mixers, means for connecting the output of each frequency mixer with the second input of the next succeeding frequency mixer in said series, frequency doubling means connected to the output of the last of said series of mixers for doubling the output frequency $n$ times where $n$ is any of a plurality of positive integers, binary register means for registering a number for controlling the output frequency from the output of the last of said series of mixers, means for introducing a number into the binary register means in accordance with the desired output frequency, means for electrically determining the number $n$ required to produce the desired output frequency, means for dividing the number in the binary register means by $2^n$, and means for connecting selected ones of said certain of said frequency sources with the respective first inputs of said frequency mixers in accordance with the quotient in said binary register means to provide a corresponding output frequency at the output of said last of said series of mixers.

References Cited in the file of this patent

UNITED STATES PATENTS

| | | |
|---|---|---|
| 2,478,973 | Mahren | Aug. 16, 1949 |
| 2,490,500 | Young | Dec. 6, 1949 |
| 2,666,141 | Clapp et al. | Jan. 12, 1954 |
| 2,749,442 | Hansel | June 5, 1956 |
| 2,813,977 | Carter | Nov. 19, 1957 |
| 2,816,229 | Vantine | Dec. 10, 1957 |
| 2,848,616 | Tollefson | Aug. 19, 1958 |

FOREIGN PATENTS

| | | |
|---|---|---|
| 641,344 | Great Britain | Aug. 9, 1950 |